(12) United States Patent
Cociglio

(10) Patent No.: US 12,094,331 B2
(45) Date of Patent: Sep. 17, 2024

(54) STATISTICAL TRACKING OF POPULATION DYNAMICS OVER AN AREA

(71) Applicant: TELECOM ITALIA S.p.A., Milan (IT)

(72) Inventor: Mauro Cociglio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 161 days.

(21) Appl. No.: 17/414,768

(22) PCT Filed: Dec. 20, 2019

(86) PCT No.: PCT/EP2019/086599
§ 371 (c)(1),
(2) Date: Jun. 16, 2021

(87) PCT Pub. No.: WO2020/127920
PCT Pub. Date: Jun. 25, 2020

(65) Prior Publication Data
US 2022/0076566 A1    Mar. 10, 2022

(30) Foreign Application Priority Data

Dec. 21, 2018    (IT) .................... 102018000020929

(51) Int. Cl.
*G08G 1/01*    (2006.01)
*G06F 17/18*    (2006.01)
(52) U.S. Cl.
CPC ........... *G08G 1/0137* (2013.01); *G06F 17/18* (2013.01); *G08G 1/0116* (2013.01)
(58) Field of Classification Search
CPC .... G06F 17/18; G08G 1/0137; G08G 1/0116; G08G 1/0125; G08G 1/147; G08G 1/141; G08G 1/165; G08G 1/0175

(Continued)

(56) References Cited

U.S. PATENT DOCUMENTS 5,684,475 A    11/1997  Krause et al.
9,870,648 B2 *  1/2018  Moran ................. G08G 1/149

(Continued)

FOREIGN PATENT DOCUMENTS

WO    WO-2012111138 A1 *  8/2012  ......... G06K 9/00778

OTHER PUBLICATIONS

Definition of population, Merriam Webster Dictionary, printed on Aug. 24, 2023. (Year: 2023).*

(Continued)

*Primary Examiner* — Michael P Nghiem
(74) *Attorney, Agent, or Firm* — Oblon, McClelland, Maier & Neustadt, L.L.P.

(57) ABSTRACT

A method and system for statistically tracking the dynamics of a population over an area comprising entry points and exit points such that each population member entering through one entry point either exits through one exit point or stations within the area. At each entry point, an entry counter counts the number of entering members and, at each exit point, an exit counter counts the number of exiting members. Based on the counter values, the dynamics of the population are statistically tracked in terms of evolution in time of the number of members stationing in the area. The number of stationing members is retroactively adjusted when during an observation period it is determined that the number of exiting members is higher than the number of entering members, plus the number of members which were stationing within the area at the beginning of the observation period.

11 Claims, 10 Drawing Sheets

(58) Field of Classification Search
USPC .......................................................... 702/179
See application file for complete search history.

(56) References Cited

U.S. PATENT DOCUMENTS

| | | | |
|---|---|---|---|
| 11,282,379 B2* | 3/2022 | Mulcahy | G08G 1/0129 |
| 2009/0048769 A1 | 2/2009 | Xu et al. | |
| 2017/0032583 A1 | 2/2017 | Moran et al. | |
| 2018/0122232 A1 | 5/2018 | Maier et al. | |
| 2018/0184395 A1 | 6/2018 | MacFarlane et al. | |
| 2018/0247534 A1* | 8/2018 | Williams | G08G 1/065 |

OTHER PUBLICATIONS

English translation of WO 2012111138, Aug. 2012. (Year: 2012).*
International Search Report and Written Opinion issued on Jan. 27, 2020 in PCT/EP2019/086599 filed on Dec. 20, 2019, 10 pages.

* cited by examiner

| to<br>from | C1 | C2 | C3 | C4 |
|---|---|---|---|---|
| C1 |  | not adjacent | not adjacent | C(U)=14 |
| C2 | not adjacent |  | not adjacent | C(S)=13 |
| C3 | not adjacent | not adjacent |  | - |
| C4 | C(R)=14 | C(X)=18 | C(Y)=9 |  |

STATISTICAL TRACKING OF POPULATION DYNAMICS OVER AN AREA

TECHNICAL FIELD

The present invention relates to the field of digital data processing. In particular, the present invention related to a method and a system for statistically tracking the dynamics of a population over an area.

In the following description and in the claims, the expression "population" will designate an ensemble of people, animals or objects provided with the capability of autonomously and unpredictably moving. Further, in the following description and in the claims, the expression "dynamics" will designate the changes over time in the number of population members within a certain area.

BACKGROUND ART

Techniques are known for monitoring or tracking the movements of physical objects (e.g. vehicles), animals or people. Such techniques typically provide for associating to each member to be monitored or tracked a unique identifier (e.g. its SIM card, an RFID tag, a barcode, etc.) and to provide a detecting system which covers a certain area and is capable of detecting such unique identifier as the member moves in the covered area.

An individual identification of each single member is not always needed. For some kinds of applications it is more interesting to investigate the statistical behaviour of a certain population as a whole, without focusing on any specific, singularly identified member of the population. For instance, in a urban context the police may be interested in a statistical analysis of the dynamics of vehicles to identify critical situations (e.g. unexpected traffic congestions in a certain area) or to identify traffic patterns e.g. for optimizing the traffic management system. In such cases, the identification of each single vehicle (e.g. of its license plate number) is not needed.

US 2009/0048769 describes a system wherein each vehicles of a group of vehicles traveling a roadway system is equipped with a in-vehicle device which receives—e.g. from GPS—global positioning data which it converts into instantaneous positions of the respective vehicle relative to a digitized road network map that represents the roadway system. The in-vehicle device intermittently transmits the instantaneous roadway positions of the vehicle to a traffic data center, which uses them to provide real-time road traffic conditions for the roadway system. The digitized road network map is partitioned into a plurality of digitized road subnetworks.

SUMMARY OF THE INVENTION

The Applicant has noticed that the technique of US 2009/0048769 exhibits some drawbacks.

In particular, the technique of US 2009/0048769 requires that every vehicle is provided with a respective in-vehicle device which autonomously determines and provides the position information relating to the vehicle. However, in some cases, not all vehicles might be equipped with such in-vehicle device. For the same reason, the technique of US 2009/0048769 is inapplicable to contexts, other than traffic, where the population to be tracked is composed by members that, by their nature, can not be provided with a device capable of determining their position, or where application of such device to every population member is practically unfeasible.

Moreover, periodic transmission of the instantaneous roadway positions from all the vehicles to the traffic data center requires an amount of transmission resources that scales with the number of vehicles, while their processing by the traffic data center entails a high computational load, which is only partially relieved by the partitioning in subnetworks.

In view of the above, the Applicant has tackled the problem of providing a method and a system for tracking the dynamics of a population over an area in a statistical way, which overcome the aforesaid drawbacks.

In particular, the Applicant has tackled the problem of providing a method and a system for tracking the dynamics of a population over an area in a statistical way, which does not require installation of any device on the population members to determine their positions and which requires less transmission resources and less computational resources than the technique of US 2009/0048769.

According to embodiments of the present invention, the above problem is solved by a method and system for statistically tracking the dynamics of a population over an area, wherein the area comprises one or more entry points and one or more exit points. The entry point(s) and exit point(s) of the area exhibit the property that each member of the population entering the area through one entry point either exits the area through one exit point or stations within the area. In other words, the entry point(s) and exit point(s) are obligatory passage points for any population member wishing to enter or exit the area. This is the case, for example, of a urban area which may be accessed by the population members (e.g. vehicles) only through certain streets or, in a rural context, a field bounded by a fence provided with one or more openings through which the population members (e.g. diary animals) may enter or exit the field. This is not the case, instead, of an area having an indefinite number of access points, e.g. an open field with no fences. According to embodiments of the present invention, at each entry point an entry counter is provided which counts the number of entering members and, similarly, at each exit point an exit counter is provided which counts the number of exiting. Based on the values of the entry counters and exit counters, a processing unit statistically tracks the dynamics of the population in terms of an evolution in time of the number of members stationing in the area. The processing unit retroactively adjusts the number of members stationing in the area when it determines that the number of members exiting the area during an observation period is higher than the number of members entering the area during the same observation period, plus the number of members stationing within said area at the beginning of that observation period.

The above property of entry point(s) and exit point(s) of the area advantageously is such that the ensemble of values of entry counter(s) and exit counter(s) is self-consistent. Hence, it may be used for providing a tracking of the dynamics of a population over the area in terms of evolution in time of the number of members stationing in the area.

Further, in order to determine the evolution in time of the number of members stationing in the area, also the number of members which were stationing in the area when the tracking was started shall be known. This is however an unknown quantity, the only known quantities being the values of the entry and exit counters.

For example, the first reading of the entry and exit counters after start of the tracking may indicate a number of entering members equal to 27 and a number of exiting members equal to 30. Hence, it may be assumed that the number of members which were stationing in the area when the tracking was started was 3, meaning that the number of stationing members at the time of the first reading is 0. If, however, the second reading of the entry and exit counters indicates a number of entering members equal to e.g. 20 and a number of exiting members equal to e.g. 25, it is then apparent that the number of stationing members at the time of the first reading was not 0 and that accordingly more than 3 members were stationing in the area when the tracking was started. The method of the present invention provides for retroactively adjusting—in particular, increasing—the number of stationing members each time it is apparent that the supposed one would not permit a certain combination of number of entering members and number of exiting members for a certain observation period.

The longer the tracking (namely, the higher the number of consecutive readings of the entry counter(s) and exit counter(s)), the higher the number of retroactive adjustments, the more accurate the estimate of the changes over time of the number of members stationing within the area.

Therefore, advantageously, the dynamics of the population are statistically tracked without requiring installation of any device on the population members to determine their positions, all the relevant information being provided by the entry counter(s) and exit counter(s) at the entry point(s) and exit point(s) of the area.

Further, the data to be transmitted to and processed by the processing unit are basically the values of entry counter(s) and exit counter(s), whose number is equal to the number of entry point(s) and exit point(s) of the monitored area. Since in most applications the latter number generally is lower than the number of population members whose dynamics shall be statistically tracked, the amount of transmission resources and computational resources is advantageously reduced in comparison to US 2009/0048769, wherein the amount of data scales with the number of population members.

According to a first aspect, the present invention provides a method for statistically tracking the dynamics of a population over an area, the area comprising at least one entry point and at least one exit point, each member of the population entering the area through the at least one entry point either exiting the area through the at least one exit point or stationing within the area, the method comprising:
  a) at each entry point, providing an entry counter counting the number of members entering the area through the entry point and, at each exit point, providing an exit counter counting the number of members exiting the area through the exit point;
  b) by a processing unit, based on values of the one or more entry counters and one or more exit counters, statistically tracking the dynamics of the population in terms of an evolution in time of the number of members stationing in the area,
wherein the number of members stationing within the area is retroactively adjusted when it is determined that the number of members exiting the area during an observation period is higher than the number of members entering the area during the observation period plus the number of members stationing within the area at the beginning of the observation period.

Preferably, the method further comprises providing a sensor at each entry point capable of detecting passage of each member entering the area through the entry point and providing a sensor at each exit point capable of detecting passage of each member exiting the area through the exit point, each entry counter counting the number of members entering the area through the entry point as detected by the sensor provided at the entry point and each exit counter counting the number of members exiting the area through the exit point as detected by the sensor provided at the exit point.

Preferably, step b) comprises applying to the values of the one or more entry counters and one or more exit counters the following equation:

$$\Delta IN - \Delta OUT = \Delta INSIDE$$

where $\Delta IN$ is the number of members entering the area during the observation period, $\Delta OUT$ is the number of members exiting the area during the observation period and $\Delta INSIDE$ is the variation of the number of the members stationing within the area during the observation period.

According to an embodiment, step b) comprises:
  at a tracking start time $T0$, setting to 0 a variable $INSIDE(0)$ indicating the number of members stationing in the area at the tracking start time $T0$;
  periodically reading the values of the one or more entry counters and one or more exit counters and, at the i-th reading, i being a reading index:
    calculating the value of $\Delta INSIDE(i)$ as $\Delta IN(i) - \Delta OUT(i)$, wherein $\Delta IN(i) = IN(i) - IN(i-1)$ and $\Delta OUT(i) = OUT(i) - OUT(i-1)$ and wherein $IN(i)$ is the summation of values of the one or more entry counters at the i-th reading, $IN(i-1)$ is the summation of values of the one or more entry counters at a preceding (i-1)-th reading, $OUT(i)$ is the summation of values of the one or more exit counters at the i-th reading and $OUT(i-1)$ is the summation of values of the one or more exit counters at the preceding (i-1)-th reading;
    calculating a number of stationing members $INSIDE(i)$ as $INSIDE(i-1) + \Delta INSIDE(i)$ and:
      if $INSIDE(i)$ is higher than or equal to 0, waiting for the next (i+1)-th reading;
      if $INSIDE(i)$ is lower than zero, adjusting all the values of $INSIDE(j)$ (j=0, 1, . . . i) previously calculated up to the i-th reading by subtracting $INSIDE(i)$ therefrom.

Preferably, the area is divided into a number of sub-areas, at least one obligatory passage point being provided between adjacent sub-areas and:
  a') at the at least one obligatory passage point, providing an intermediate counter counting the number of members passing between adjacent sub-areas through the obligatory passage point; and
  b') representing the area as a graph, each node of the graph representing an entry point or an exit point of the area or an obligatory passage point of the area provided with a respective intermediate counter, the nodes being joined by arrows indicating unidirectional links between nodes as allowed by the physical topology of the area.

Each obligatory passage point between adjacent sub-areas of the area may be provided with a respective intermediate counter.

Alternatively, only a subset of the obligatory passage points between adjacent sub-areas of the area is provided with a respective intermediate counter.

In the latter case, the method comprises determining the graph from a complete graph comprising nodes representing the at least one entry point of the area, the at least one exit point of the area and all obligatory passage points of the area, the determining comprising:

providing a list L1 of links of the complete graph originated and/or terminated by a node representing an obligatory passage point not provided with intermediate counter and providing a further list L3 of links of the complete graph originated and terminated by nodes representing exit points, entry points or obligatory passage points provided with intermediate counters;

for each obligatory passage point not provided with intermediate counter:

finding in the list L1 all links originated and/or terminated by the obligatory passage point not provided with intermediate counter;

forming at least one new link by combining each found link terminated by the obligatory passage point not provided with intermediate counter with each found link originated by the obligatory passage point not provided with intermediate counter;

if the at least one new link is originated and terminated by nodes representing exit points, entry points or obligatory passage points provided with intermediate counters, inserting the at least one new link in the further list L3;

if the at least one new link is originated and/or terminated by a further obligatory passage point not provided with intermediate counter, inserting the at least one new link in the list L1; and removing the links originated and/or terminated by the obligatory passage point not provided with intermediate counter from the list L1.

building the graph using the links of the further list L3.

According to embodiments, step b) further comprises splitting the graph into one or more clusters, each cluster being a set of nodes of the graph wherein each member entering the cluster though an entry node of the cluster either exits the cluster through an exit node of the cluster or stations within the cluster, step b) further comprising, for at least one of the clusters:

by the processing unit, based on values of one or more counters provided at one or more entry nodes of the cluster and one or more counters provided at one or more exit nodes of the cluster, statistically tracking the dynamics of the population in terms of an evolution in time of the number of members stationing in the cluster, wherein the number of members stationing within the cluster is retroactively adjusted when it is determined that the number of members exiting the cluster during the observation period is higher than the number of members entering the cluster during the observation period plus the number of members stationing within the cluster at the beginning of the observation period.

Preferably, the method further comprises statistically tracking the dynamics of the population in terms of number of members displacing amongst the clusters based on the values of the one or more counters provided at one or more entry nodes of each cluster and values of the one or more counters provided at one or more exit nodes of each cluster.

According to a second aspect, the present invention provides a system for statistically tracking the dynamics of a population over an area, the area comprising at least one entry point and at least one exit point, each member of the population entering the area through the at least one entry point either exiting the area through the at least one exit point or stationing within the area, the system comprising:

at each entry point, an entry counter counting the number of members entering the area through the entry point and, at each exit point, an exit counter counting the number of members exiting the area through the exit point; and a processing unit configured to, based on values of the one or more entry counters and one or more exit counters, statistically track the dynamics of the population in terms of an evolution in time of the number of members stationing in the area, wherein the processing unit is configured to retroactively adjust the number of members stationing within the area when it is determined that the number of members exiting the area during an observation period is higher than the number of members entering the area during the observation period plus the number of members stationing within the area at the beginning of the observation period.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
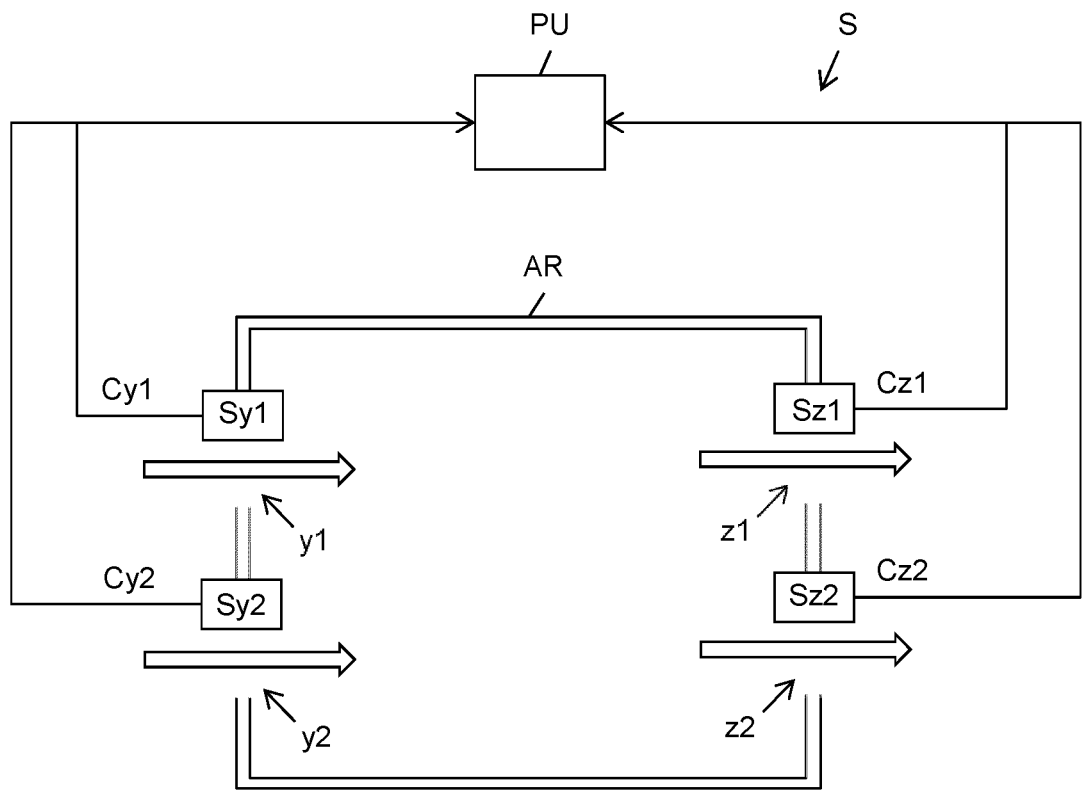
FIG. 1 schematically shows a system according to an embodiment of the present invention.

FIG. 1 schematically shows a system for statistically tracking the dynamics of a population over an area according to embodiments of the present invention.

The monitored area AR is preferably provided with one or more entry points and one or more exit points. By way of non limiting example, the area AR shown in FIG. 1 is provided with two entry points y1, y2 and two exit points z1, z2. The entry point y1, y2 and exit points z1, z2 are obligatory passage points for entering or exiting the area AR. Hence, any member of a population entering the area AR through the entry point y1 or y2 either stations within the area AR or exits the area AR through the exit point z1 or z2.

For example, the area AR may be a urban area which may be accessed by members of a population (e.g. vehicles) only through certain streets or, in a rural context, a field bounded by a fence provided with one or more openings through which the population members (e.g. dairy animals) may enter or exit the field.

It shall also be noticed that an entry point (e.g. y1) and an exit point (e.g. z1) may represent a same bidirectional physical access (e.g. a two-way street) allowing both entering and exiting the area AR. However, for the purpose of the present invention, any bidirectional access of the area AR is preferably logically split into two unidirectional accesses, namely an entry point and an exit point.

Preferably, each exit point z1, z2 is reachable by a population member from anyone of the entry points y1, y2. For example, predefined paths may be traced within the area AR which join each entry point y1, y2 to each exit point z1, z2. Alternatively, no predefined path is traced and the population members may freely circulate within the area AR and freely decide which path to follow from the entry point y1 or y2 to the exit point z1 or z2.

The system S according to embodiments of the present invention preferably comprises, for each entry point y1, y2 of the area AR, a respective sensor Sy1, Sy2 capable of detecting the passage of each entering population member through the respective entry point y1, y2. Similarly, for each exit point z1, z2 of the area AR, the system S preferably comprises a respective sensor Sz1, Sz2 capable of detecting the passage of each exiting population member through the respective exit point z1, z2. The sensors Sy1, Sy2, Sz1, Sz2 are preferably passage sensors capable of merely detecting the passage of a population member, without determining its identity.

For example, the sensors may be optical sensors or magnetic sensors.

According to embodiments of the present invention, at each entry point y1, y2 an entry counter Cy1, Cy2 is preferably provided, which counts the number of members entering the area AR through the entry point y1, y2 as detected by the sensor Sy1, Sy2. Similarly, at each exit point z1, z2 an exit counter Cz1, Cz2 is preferably provided, which counts the number of members exiting the area AR through the exit point z1, z2 as detected by the sensor Sz1, Sz2.

Preferably, the system S also preferably comprises a processing unit PU configured to gather the values of entry counters Cy1, Cy2 and exit counters Cz1, Cz2 and, based on such values, to statistically track the dynamics of the population in terms of an evolution in time of the number of members stationing in the area AR.

In particular, since the entry points y1, y2 and exit points z1, z2 of the area AR are obligatory passage points for entering or exiting the area AR (namely, any member of a population entering the area AR through the entry point y1 or y2 either stations within the area AR or exits the area AR through the exit point z1 or z2), the following equation is valid:

$$\Delta IN - \Delta OUT = \Delta INSIDE \qquad [1]$$

where $\Delta IN$ is the number of population members entering the area AR during a certain observation period, $\Delta OUT$ is the number of population members exiting the area during the same observation period and $\Delta INSIDE$ is the variation of the number of the population members stationing within the area AR during the same observation period. Equation [1] relates to the variation of the number of the population members stationing within the area AR, hence it can be estimated without any knowledge of the absolute number of population members stationing within the area AR.

According to embodiments of the present invention, the processing unit PU preferably uses the above equation [1] to track the dynamics of the population in terms of an evolution in time of the number of members stationing in the area AR, as it will be described in detail with reference to the flow chart of FIG. 2.

As the tracking starts at time T0, three variables IN(0), OUT(0) and INSIDE(0) indicating the number of entering members, exiting members and stationing members at the start time T0, respectively, are preferably set equal to 0 (step 200). By setting INSIDE(0) equal to zero, the processing unit PU basically assumes that no population members are stationing within the area AR at the start time T0. This is only an assumption, because the number of population members stationing within the area AR at the time T0 is unknown and may be a priori different from 0.

At step 200, also the values of the entry counters Cy1, Cy2 and exit counters Cz1, Cz2 are preferably reset.

Then, the values of the entry counters Cy1, Cy2 and exit counters Cz1, Cz2 are preferably periodically read (step 201). The reading of the counter values is preferably performed every Tr seconds. The reading period Tr is preferably higher than 1 minute. Hence, the readings of the counter values are performed at T1=T0+Tr, T2=T0+2Tr, T3=T0+3Tr, etc.

At the i-th reading, the processing unit PU preferably calculates the value of $\Delta INSIDE(i)$ (namely, of the variation of the number of the population members stationing within the area AR during the observation period comprised between the (i−1)-th reading and the i-th reading) by applying the above equation [1] (step 202), namely:

$$\Delta INSIDE(i) = \Delta IN(i) - \Delta OUT(i) \qquad [2]$$

wherein $\Delta IN(i) = IN(i) - IN(i-1)$, $\Delta OUT(i) = OUT(i) - OUT(i-1)$ and wherein IN(i) is the summation of values of the entry counters Cy1, Cy2 at the i-th reading, IN(i−1) is the summation of values of the entry counters Cy1, Cy2 at the (i−1)-th reading, OUT(i) is the summation of values of the exit counters Cz1, Cz2 at the i-th reading and OUT(i−1) is the summation of values of the exit counters Cz1, Cz2 at the (i−1)-th reading.

The processing unit PU then preferably calculates the number of stationing members INSIDE(i) at the i-th reading by applying the following equation (step 203):

$$INSIDE(i) = INSIDE(i-1) + \Delta INSIDE(i) \qquad [3]$$

If INSIDE(i) is higher than or equal to 0, the processing unit PU only waits for the next reading.

If instead INSIDE(i) is lower than zero, the processing unit PU determines that the number of stationing members INSIDE(0) at the start time T0 was higher than 0, because the area AR can not comprise a negative number of stationing members at the i-th reading. Then, the processing unit PU preferably adjusts all the values of INSIDE(j) (j=0, 1, . . . i) previously calculated up to that reading of the counter values by applying the following equation (step 204):

$$INSIDE(j) = INSIDE(j) - INSIDE(i) \qquad [4]$$

where j is an index ranging from 0 to the value of the index i. It shall be noticed that, since INSIDE(i) is lower than zero, all the values of INSIDE(j) basically are increased by the absolute value of INSIDE(i). With j=0, the processing unit adjusts the value of INSIDE(0). The value of INSIDE(i) following to the adjustment of equation [4] is instead 0.

The processing unit PU then waits for the next reading. If, at a subsequent reading, the value of INSIDE(i) calculated by applying the above equation [3] (step 202) is again lower than zero, the processing unit PU performs another adjustment of the values of INSIDE(j) (j=0, 1, . . . i) calculated up to that reading by applying again thereto the above equation [4].

The above steps are repeated, until the processing unit PU determine that the tracking shall be ended (step 206).

The property of entry points y1, y2 and exit points z1, z2 of the area AR whereby they are obligatory passage points for entering or exiting the area AR advantageously is such that the ensemble of values of entry counters Cy1, Cy2 and exit counters Cz1, Cz2 is self-consistent. Hence, it may be used for providing a tracking of the dynamics of a population over the area AR in terms of evolution in time of the number of members stationing in the area AR, namely as a sequence of the values INSIDE(0), INSIDE (1), INSIDE(2), etc.

By exploiting the same property of entry points y1, y2 and exit points z1, z2 of the area AR, the processing unit PU in particular may retroactively adjust the values of INSIDE(0), INSIDE(1), INSIDE(2), etc. already calculated at the previous readings of the counter values, each time it is apparent that they would not permit a certain combination of number of entering members and number of exiting members.

Assuming that all the population members which were stationing within the area AR at T0 will sooner or later move and exit the area AR through any of the exit points z1, z2, the longer the tracking (namely, the higher the number of consecutive readings of the entry counter(s) and exit counter(s)), the higher the number of retroactive adjustments, the more accurate the estimate of the changes over time of the number of members stationing within the area AR in terms of sequence of values INSIDE(0), INSIDE (1), INSIDE(2), etc.

Therefore, advantageously, the dynamics of the population are statistically tracked without requiring installation of any device on the population members to determine their positions, all the relevant information being provided by the entry counters Cy1, Cy2 and exit counters Cz1, Cz2.

Further, the data to be transmitted to and processed by the processing unit PU are basically the values of entry counters Cy1, Cy2 and exit counters Cz1, Cz2, whose number (4) is equal to the number of entry points y1, y2 and exit points z1, z2 of the monitored area AR. Since in most applications the latter number generally is lower than the number of population members whose dynamics shall be statistically tracked, the amount of transmission resources and computational resources is advantageously reduced.

Herein after, a numerical example will be described to clarify the operation of the processing unit PU according to the flow chart of FIG. 2.

At the beginning, IN(0), OUT(0) and INSIDE(0) are set equal to 0 (step 200).

It is assumed that, at the first reading of the counter values at time T1=T0+Tr (i=1, step 201), the read values of the entry counters Cy1, Cy2 provide $\Delta IN(1)=30$ and the read values of the exit counters Cz1, Cz2 provide $\Delta OUT(1)=23$, which result in a value of $\Delta INSIDE(1)=30-23=7$ (equation [2], step 202). The processing unit PU then calculates INSIDE(1)=INSIDE(0)+$\Delta$INSIDE(1)=7 (equation [3], step 203). This value is positive, so no adjustment is needed.

At the second reading at time T2=T0+2Tr (i=2, step 201), it is assumed that the read values of the entry counters Cy1, Cy2 provide $\Delta IN(2)=22$ and the read values of the exit counters Cz1, Cz2 provide $\Delta OUT(2)=34$, which result in a value of $\Delta INSIDE(2)=22-34=-12$ (equation [2], step 202). The processing unit PU then calculates INSIDE(2)=INSIDE(1)+$\Delta$INSIDE(2)=7-12=-5 (equation [3], step 203). This value is negative, so the processing unit PU preferably adjusts INSIDE(0), INSIDE(1) and INSIDE(2) according to the above equation [4], thereby obtaining:

INSIDE(0)=INSIDE(0)−INSIDE(2)=0−(−5)=5;

INSIDE(1)=INSIDE(1)−INSIDE(2)=7−(−5)=12; and

INSIDE(2)=INSIDE(2)−INSIDE(2)=−5−(−5)=0.

It is now assumed that, at the third reading of the counter values at time T3=T0+3Tr (i=3, step 201), the read values of the entry counters Cy1, Cy2 provide $\Delta IN(3)=20$ and the read values of the exit counters Cz1, Cz2 provide $\Delta OUT(3)=18$, which result in a value of $\Delta INSIDE(3)=20-18=2$ (equation [2], step 202). The processing unit PU then calculates INSIDE(3)=INSIDE(2)+$\Delta$INSIDE(3)=0+2=2 (equation [3], step 203). This value is positive, so no adjustment is needed.

At the fourth reading at time T4=T0+4Tr (i=4, step 201), it is assumed that the read values of the entry counters Cy1, Cy2 provide $\Delta IN(4)=15$ and the read values of the exit counters Cz1, Cz2 provide $\Delta OUT(4)=20$, which result in a value of $\Delta INSIDE(4)=15-20=-5$ (equation [2], step 202). The processing unit PU then calculates INSIDE(4)=INSIDE(3)+$\Delta$INSIDE(4)=2-5=-3 (equation [3], step 203).

This value is negative, so the processing unit PU preferably adjusts INSIDE(0), INSIDE(1), INSIDE(2), INSIDE (3) and INSIDE(4) according to the above equation [4], thereby obtaining:

INSIDE(0)=INSIDE(0)−INSIDE(4)=5−(−3)=8;

INSIDE(1)=INSIDE(1)−INSIDE(4)=12−(−3)=15;

INSIDE(2)=INSIDE(2)−INSIDE(4)=0−(−3)=3;

INSIDE(3)=INSIDE(3)−INSIDE(4)=2−(−3)=5; and

INSIDE(4)=INSIDE(4)−INSIDE(4)=−3−(−3)=0.

And so on.

Hence, even if at the start time T0 it was assumed that INSIDE(0)=0 (namely that no population members were stationing within the area AR), the counter values have revealed that more than 0 population members were originally stationing within the area AR. This value has been firstly adjusted at T2 from 0 to 5, since at the last reading of the counter values it has become apparent that, since the number of population members was increased by $\Delta$INSIDE (1)=7 during the first observation period comprised between T0 and T1 and was decreased by $\Delta$INSIDE(2)=−12 during the second observation period comprised between T1 and T2, at least INSIDE(0)=5 population members must have been stationing within the area AR at the start time T0. This value of INSIDE(0) has been adjusted again at T4 from 5 to 8, since at the last reading of the counter values it has become apparent that, since the number of population members was increased by $\Delta$INSIDE(1)=7 between T0 and T1, then decreased by $\Delta$INSIDE(2)=−12 between T1 and T2, then increased again by $\Delta$INSIDE(3)=2 between T2 and T3 and then decreased again by $\Delta$INSIDE(4)=−5 between T3 and T4, at least INSIDE(0)=8 population members must have been stationing within the area AR at the start time T0.

Assuming that all the population members which were stationing within the area AR at T0 will sooner or later move and exit the area AR through any of the exit points z1, z2, the longer the tracking, the higher the number of retroactive adjustments, the more accurate the values of the sequence of variables INSIDE(0), INSIDE(1), INSIDE(2), INSIDE(3), INSIDE(4) etc. indicating the changes over time of the number of members stationing within the area AR.

Figure 2:
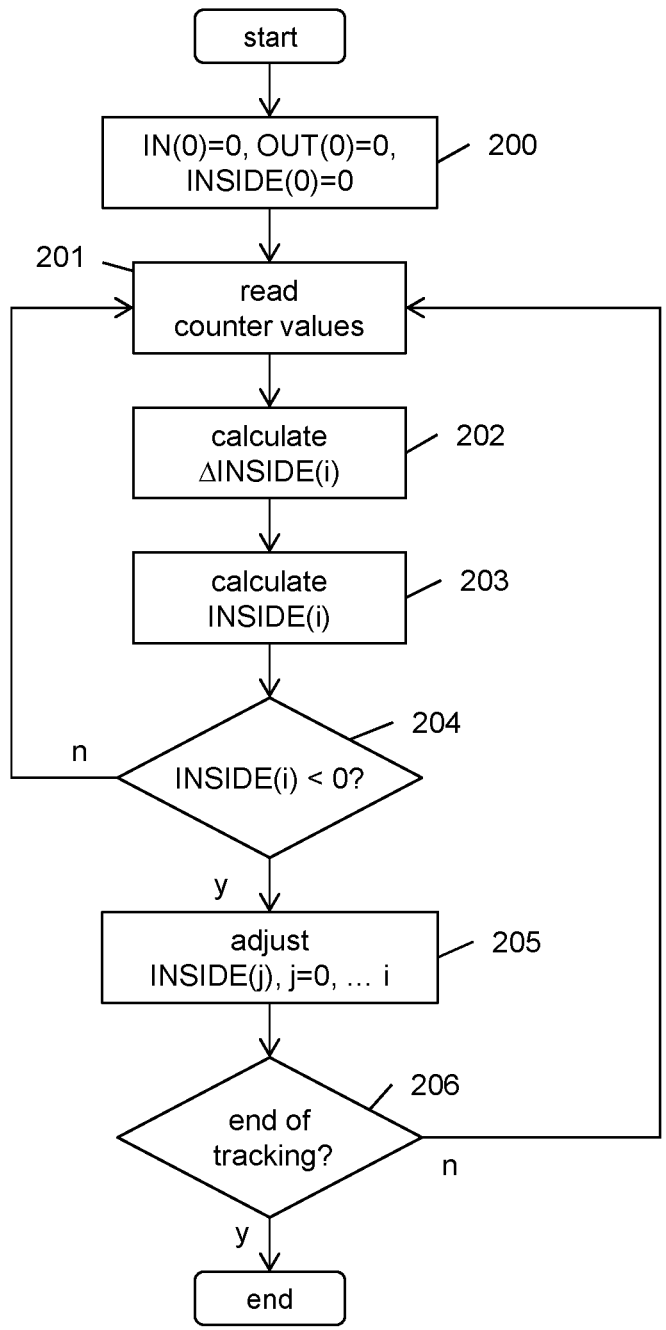
FIG. 2 is a flow chart of the operation of the system of FIG. 1, according to embodiments of the present invention.

The values of ΔIN(i), ΔOUT(i), INSIDE(i) and ΔINSIDE (i) calculated by the processing unit PU according to the flow chart of FIG. 2 may be advantageously provided at the input of other data processing algorithms (e.g. neural networks), e.g. for reconstructing the patterns of vehicles (traffic congestions, queues, etc.) due to car accidents, work in progress, failures to traffic lights, etc. This may be useful for example in the context of smart city applications, to manage the traffic and transportation systems more efficiently.

Herein below, an exemplary application of the system S above will be described, in the context of smart city applications.

Figure 3:
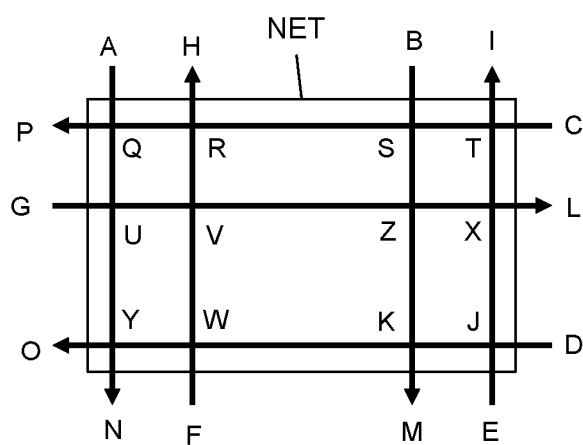
FIG. 3 is an exemplary road network to which the method according to embodiments of the present invention may be applied.

FIG. 3 shows an exemplary urban area consisting of a road network NET made of a number of roads disposed according to a certain topology. For simplicity, it is assumed that the roads are one-way roads (each two-way road is represented as two logically split one-way roads). The road network NET has seven entry points A, B, C, D, E, F, G and seven exit points H, I, L, M, N, O, P. The road network NET also forms twelve intersections K, J, Q, R, S, T, U, V, W, X, Y, Z.

All the entry points and exit points and at least some of the intersections of the network NET may be provided with respective sensors capable of detecting the passage of population members and respective counters, as described above.

Every intersection may be provided with a respective sensor and counter, in which case the network NET is a "completely monitored network".

At the intersections, the sensors may be provided in various ways.

Figure 4A:
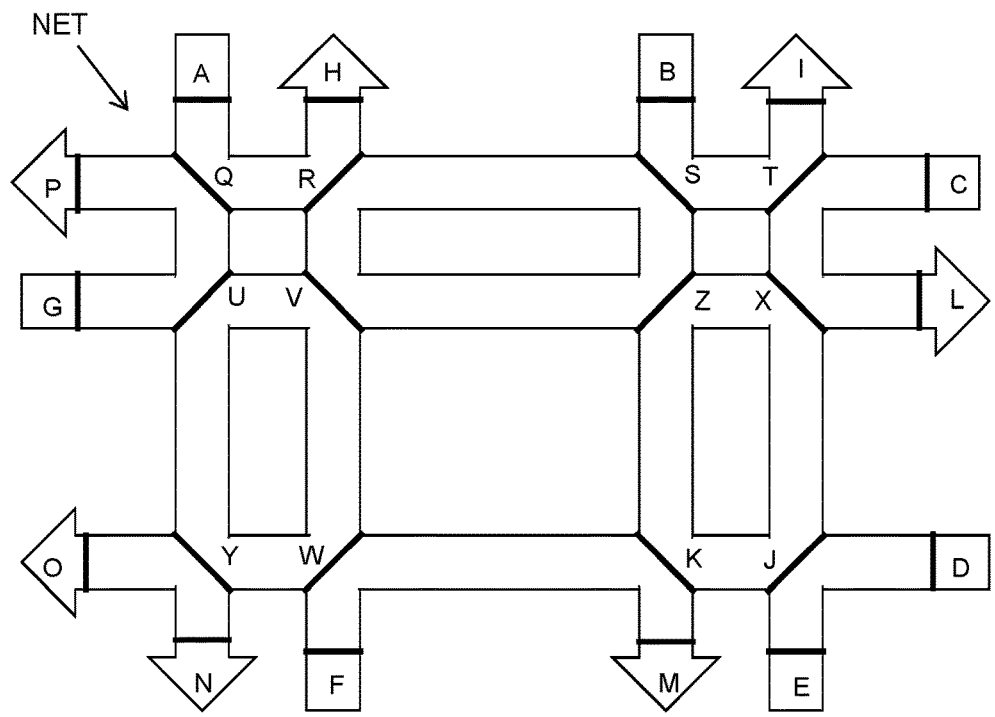
FIGS. 4a and 4b show the network of FIG. 3 with a first exemplary arrangement of sensors and the related graph, respectively.

For example, as shown in FIG. 4a, each intersection K, J, Q, R, S, T, U, V, W, X, Y, Z of the network NET may be provided with a respective sensor (represented by a thick line in the drawing) capable of detecting all the population members crossing the intersection from any incoming direction to any outgoing direction thereof. Such kind of sensor for instance may comprise an elongated element (e.g. cables or coils) diagonally positioned through the intersection so as to intercept all the population members irrespective of their incoming direction and outgoing direction.

Figure 4B:
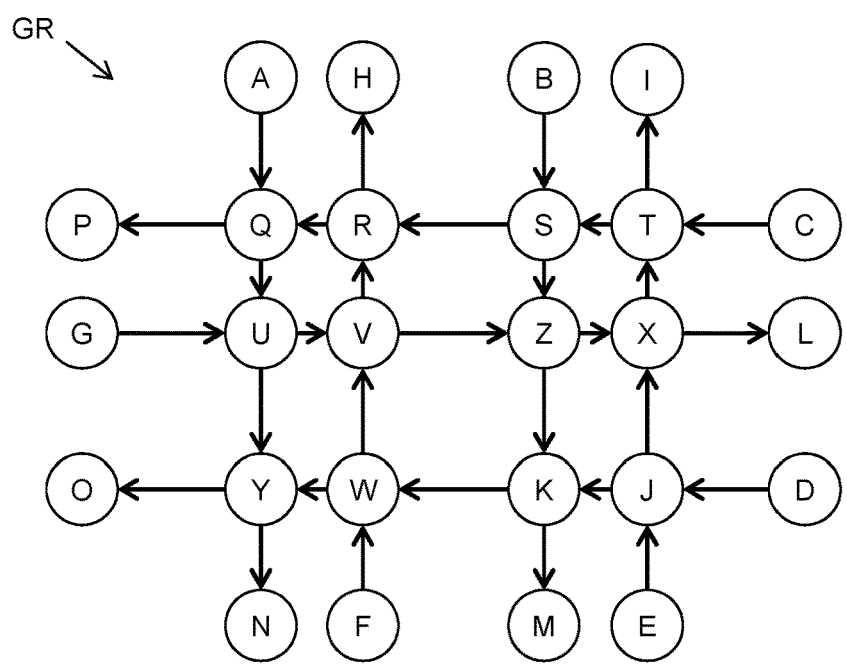

The topology of the network NET with the sensors disposed as per FIG. 4a may be represented by the graph shown in FIG. 4b. The graph GR has a number of nodes (in particular, 26 nodes) representing the sensors provided at the entry points, exit points and intersections of the network NET. In the graph GR, the nodes are joined by arrows indicating the unidirectional links between the nodes as allowed by the physical topology of the road network NET. A node corresponding to the sensor of an entry point of the network NET has only outgoing arrows. A node corresponding to the sensor of an exit point of the network NET has only incoming arrows. A node corresponding to the sensor of an intersection has both incoming arrows and outgoing arrows, in particular two incoming arrows and two outgoing arrows.

Figure 5A:
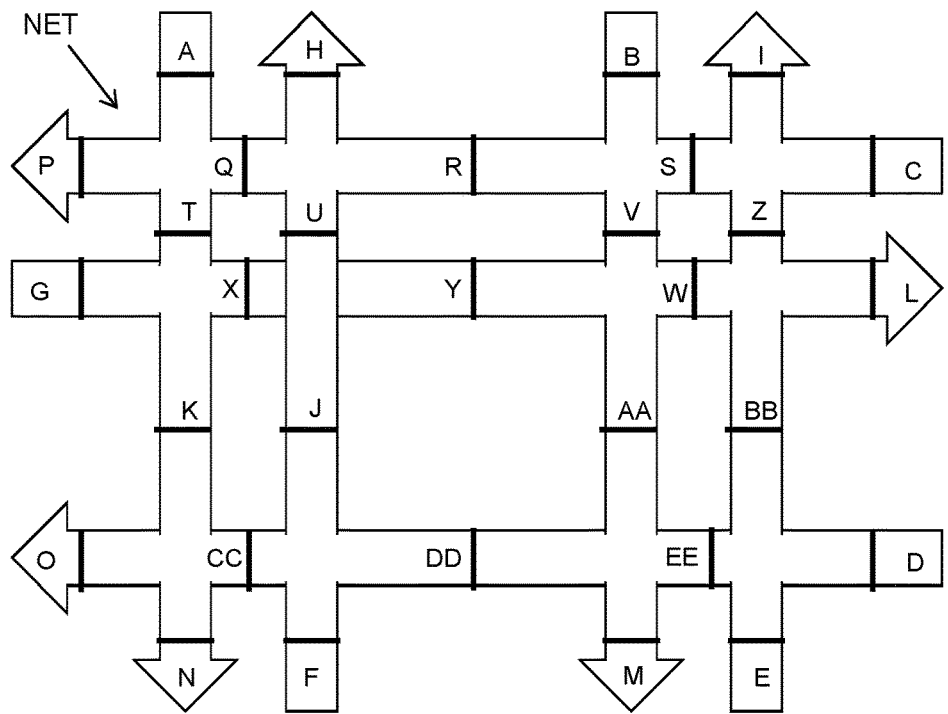
FIGS. 5a and 5b show the network of FIG. 3 with a second exemplary arrangement of sensors and the related graph, respectively.

Alternatively, as depicted in FIG. 5a, in addition to providing a sensor for each entry point and exit point of the network NET, a sensor may be provided on each road joining two intersections. Each intersection is therefore monitored by four sensors, some of which may coincide with the sensors of the entry points or exit points. This arrangement requires a higher number of sensors (17 instead of 12 in the preceding case), but in turn is capable of distinguishing population members crossing the intersection from different incoming directions and to different outgoing directions.

Figure 5B:
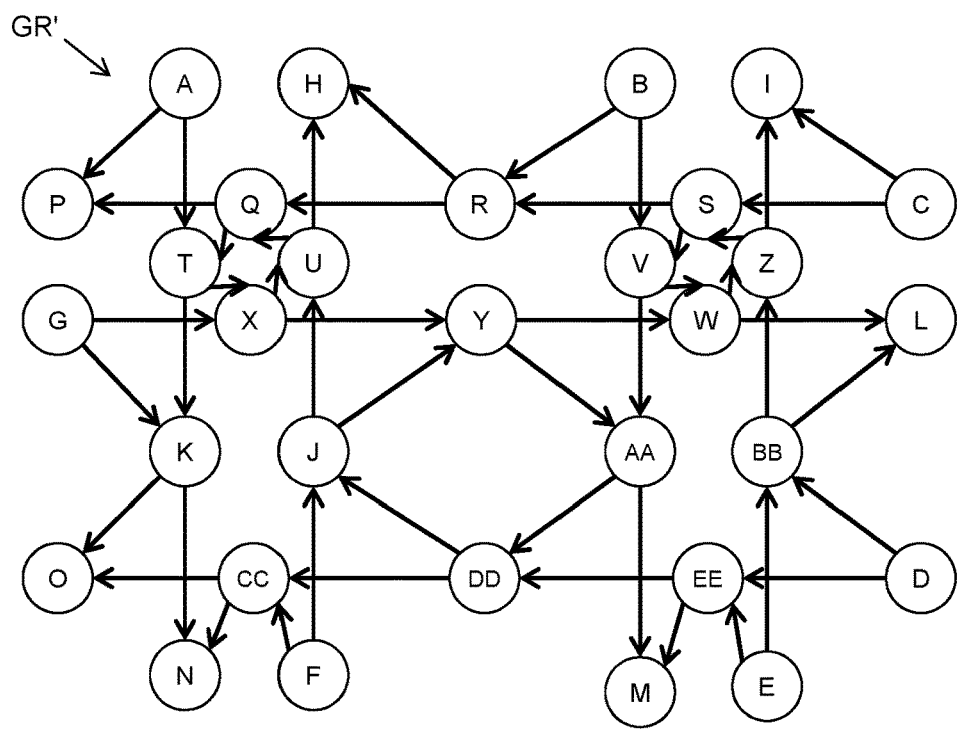

The topology of the road network NET with the sensors disposed as per FIG. 5a may be represented by the graph GR' shown in FIG. 5b. The graph GR' has a number of nodes (in particular, 31 nodes) representing the sensors provided at the entry points of the network NET, exit points of the network NET and roads joining the intersections of the network NET. The nodes are joined by arrows indicating the unidirectional links between the nodes as allowed by the physical topology of the road network NET. It may be appreciated that, in this case, some of the nodes corresponding to sensors located at positions other then entry points and exit points of the network NET may have more than 2 incoming arrows or more than 2 outgoing arrows.

Figure 6A:
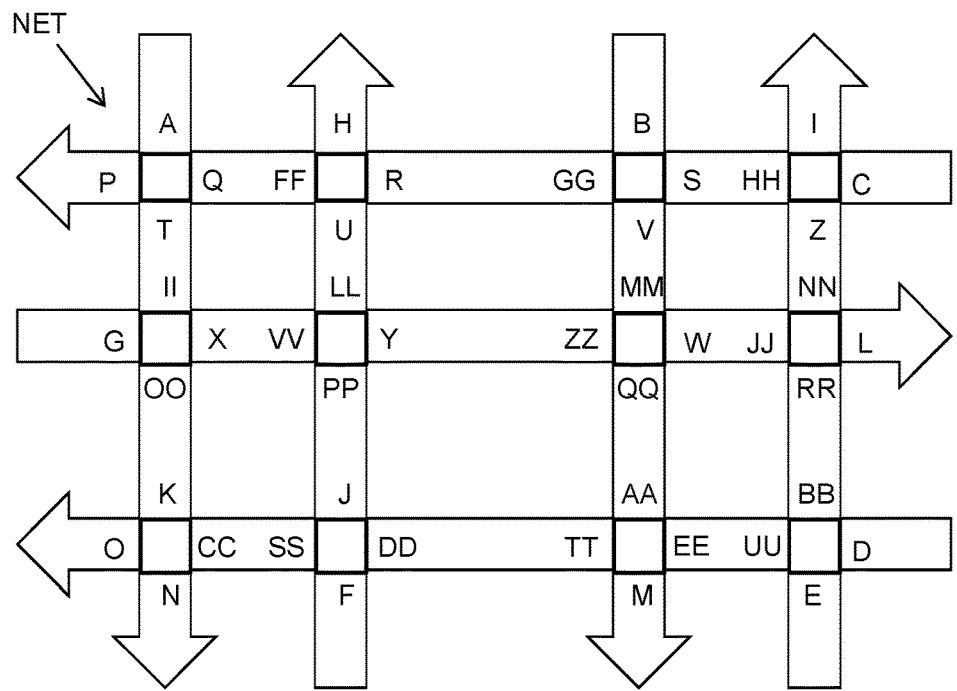
FIGS. 6a and 6b show the network of FIG. 3 with a third exemplary arrangement of sensors and the related graph, respectively.

Still alternatively, as depicted in FIG. 6a, each intersection of the network NET may be provided with a number of sensors, in particular a sensor for each one of the entrances and exits of the intersection. In this case, the sensors at the entry points and exit points of the network NET may be avoided, because they are redundant with the intersection sensors. In this case, the number of sensors is still higher but the monitoring capabilities are increased too.

Figure 6B:
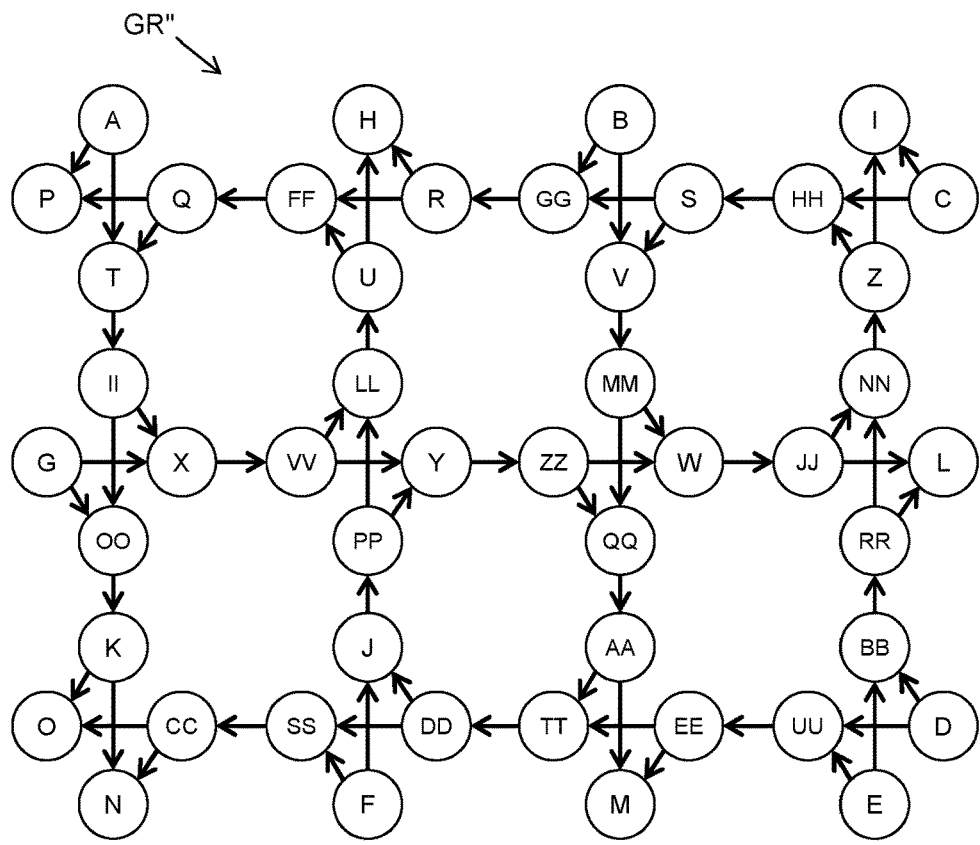

The topology of the road network NET with the sensors disposed as per FIG. 6a may be represented by the graph GR" shown in FIG. 6b. The graph has a number of nodes (in particular, 48 nodes) representing the sensors provided at each intersection. Again, the nodes are joined by arrows indicating the unidirectional links between the nodes as allowed by the physical topology of the road network. Also in this case, some of the nodes may have more than 2 incoming arrows or more than 2 outgoing arrows.

In all the above described cases, every intersection of the road network NET is provided with at least one sensor, namely the road network NET is completely monitored. However, for some applications, a complete monitoring may be not required or even not feasible, for example if it is practically unfeasible to install sensors at one or more of the intersections of the network NET.

Figure 7A:
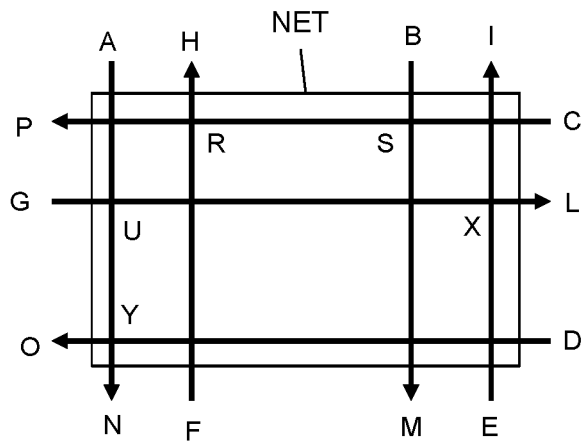
FIGS. 7a and 7b show the network of FIG. 3 with a fourth exemplary arrangement of sensors and the related graph, respectively.

For example, as depicted in FIG. 7a, amongst the twelve intersections of the road network NET, only five intersections R, S, U, X and Y may be provided with respective sensors.

Figure 7B:
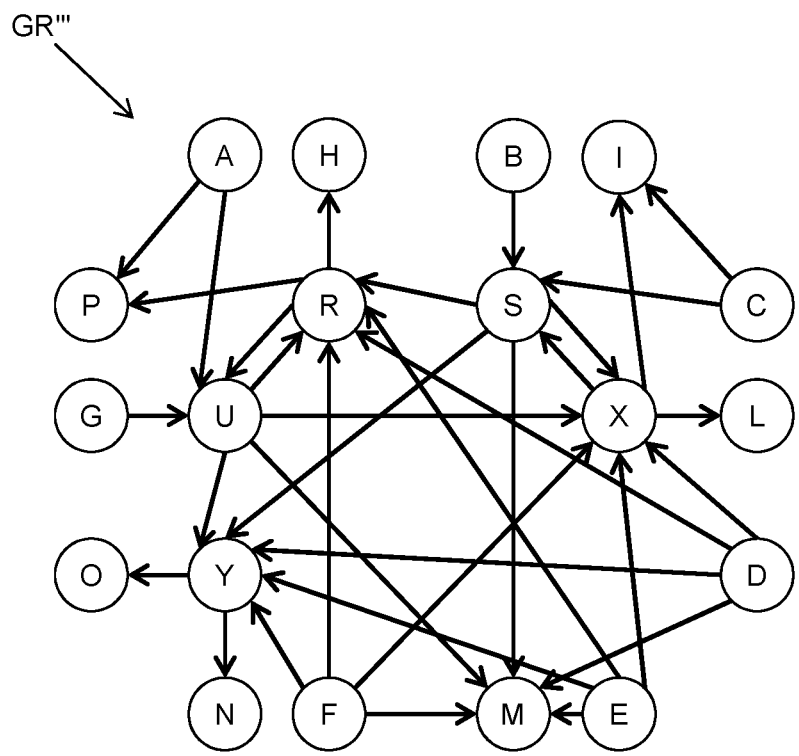

Assuming that each one of the five monitored intersections R, S, U, X and Y is provided with a single respective sensor as depicted in FIG. 4a, the resulting topology of the road network NET and sensors may be represented by the graph GR''' shown in FIG. 7b. Similarly to the graphs representing the network NET when completely monitored, also in the graph GR''' each node represents a sensors provided at an entry point, exit point or intersection of the network NET, while the arrows represent the unidirectional links between the nodes as allowed by the physical topology of the road network NET.

Herein after, a procedure will be described for obtaining a graph which, similarly to the graph GR" of FIG. 7b, represents a partially monitored network.

Figure 8:
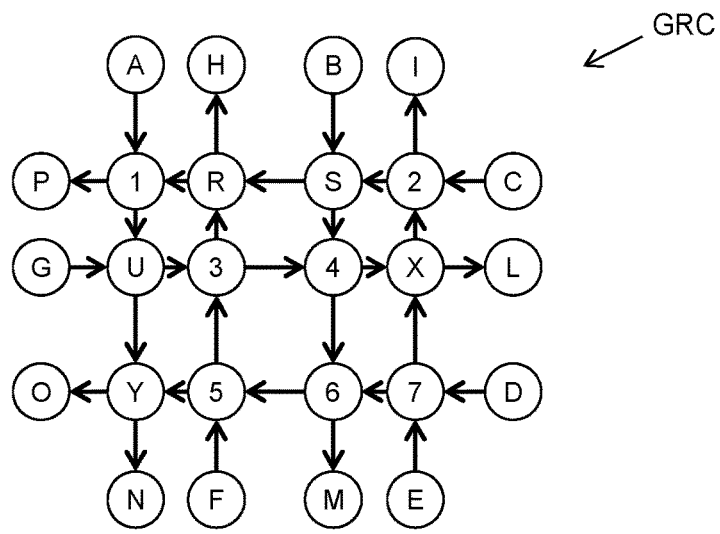
FIG. 8 shows a complete graph used for determining the graph of a partially monitored network.

Preferably, the starting point is a complete graph GRC representing the network NET and comprising both nodes representing sensors actually present in the network NET partially monitored and nodes representing sensors missing from the network NET partially monitored but which should be provided if the network NET were completely monitored. With reference for example to the partially monitored network NET of FIG. 7a, FIG. 8 shows the corresponding complete graph GRC, wherein the letters indicating the nodes representing the missing sensors at the intersections K, J, Q, T, V, W and Z have been replaced with corresponding integer numbers 1, 2, 3, 4, 5, 6 and 7.

Herein after, nodes representing sensors provided at entry points, exit points and intersections of the network NET will be termed for simplicity "monitored nodes", whereas nodes representing sensors missing from the partially monitored network NET but which should be provided if the network NET were completely monitored will be termed for simplicity "non monitored nodes".

The complete graph GRC comprises unidirectional links between nodes (either monitored or non monitored), namely (A, 1), (R, H), (B, S), (2, 1), (C, 2), (2, S), (S, R), (R, 1), (1, P), (1, U), (3, R), (S, 4), (X, 2), (G, U), (U, 3), (3, 4), (4, X), (X, L), (U, Y), (5, 3), (4, 6), (7, X), (D, 7), (7, 6), (6, 5), (5, Y), (Y, O), (Y, N), (F, 5), (6, M), (E, 7). Within the parentheses representing each link, the leftmost node is the node originating the link and the rightmost node is the node terminating the link.

Figure 9:
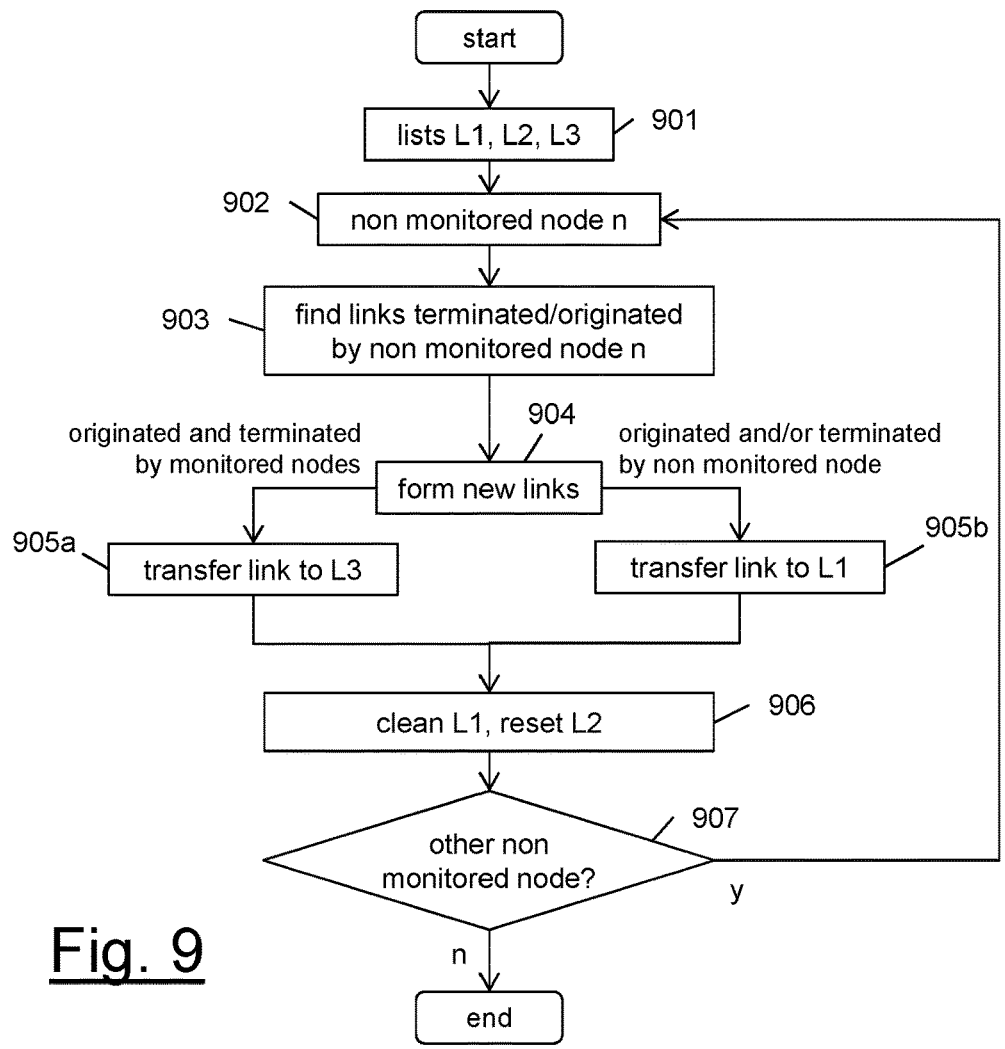
FIG. 9 is a flow chart of a procedure for determining the graph of a partially monitored network.

With reference now to FIG. 9, in order to determine the links of the graph representing the network NET partially monitored, three lists are preferably provided (step 901), namely;
- a list L1 of links of the complete graph GRC originated and/or terminated by a non monitored node;
- a list L2 of new links, initially empty; and
- a list L3 of final links, comprising links originated and terminated by monitored nodes. At the beginning of the procedure, this list comprises only the links originated and terminated by monitored nodes, amongst all the links of the complete graph GRC. At the end of the procedure, the list L3 will comprise all the links of the graph representing the network NET partially monitored.

Then, for each non monitored node n (with n=1, 2, 3, . . . ) (step 902), the following steps are preferably performed.

First, in the list L1 all the links are found either originated or terminated by the non monitored node n (step 903).

Then, new links are formed by combining each link found at step 903 and terminated by the non monitored node n with each link found at step 903 and originated by the non monitored node n (step 904). When a new link is formed, it is preferably written in the list L2 of new links. The new links formed at step 904 may be originated and terminated by monitored nodes, or they may be originated and/or terminated by a non monitored node (other than the non monitored node n).

Then, the links formed at step 904 which are originated and terminated by monitored nodes are transferred to the list L3 of final links, unless already present (step 905a), while the links formed at step 904 which are originated and/or terminated by a non monitored node are transferred back to the list L1, unless already present (step 905b).

Then, the list L1 is cleaned by removing the original links either originated or terminated by the non monitored node n and the list L2 of new links is reset (step 906), before repeating the above steps for the subsequent non monitored node.

As the above steps are repeated for each non monitored node n (step 907), the list L3 is gradually populated with the links of the graph representing the partially monitored network NET. The list L1 is at the same time depleted.

For example, with reference to the exemplary partially monitored network NET shown in FIG. 7a, the lists L1 and L3 are initially as follows:
L1: (A, 1), (2, I), (C, 2), (2, S), (R, 1), (1, P), (1, U), (3, R), (S, 4), (X, 2), (U, 3), (3, 4), (4, X), (5, 3), (4, 6), (7, X), (D, 7), (7, 6), (6, 5), (5, Y), (F, 5), (6, M), (E, 7);
L3: (R, H), (B, S), (S, R), (G, U), (X, L), (U, Y), (Y, O), (Y, N).

At the first iteration for the non monitored node 1, the following links are retrieved from the list L1: (A, 1), (R, 1), (1, P) and (1, U), which provide the following list L2 of new links: (A, P), (A, U), (R, P), (R, U). All the new links are originated and terminated by monitored nodes, so the lists L1, L3 at the end of the first iteration are:
L1: (2, I), (C, 2), (2, S), (3, R), (S, 4), (X, 2), (U, 3), (3, 4), (4, X), (5, 3), (4, 6), (7, X), (D, 7), (7, 6), (6, 5), (5, Y), (F, 5), (6, M), (E, 7);
L3: (R, H), (B, S), (S, R), (G, U), (X, L), (U, Y), (Y, O), (Y, N), (A, P), (A, U) (R, P), (R, U).

At the second iteration for the non monitored node 2, the following links are retrieved from the list L1: (2, I), (C, 2), (2, S) and (X, 2), which provide the following list L2 of new links: (C, S), (C, I), (X, S), (X, I). All the new links are again originated and terminated by monitored nodes, so the lists L1, L3 at the end of the second iteration are:
L1: (3, R), (S, 4), (U, 3), (3, 4), (4, X), (5, 3), (4, 6), (7, X), (D, 7), (7, 6), (6, 5), (5, Y), (F, 5), (6, M), (E, 7);
L3: (R, H), (B, S), (S, R), (G, U), (X, L), (U, Y), (Y, O), (Y, N), (A, P), (A, U), (R, P), (R, U), (C, S), (C, I), (X, S), (X, I).

At the third iteration for the non monitored node 3, the following links are retrieved from the list L1: (3, R), (U, 3), (3, 4), (5, 3) which provide the following list L2 of new links: (U, R), (U, 4), (5, R), (5, 4). Only the new link (U, R) is originated and terminated by monitored nodes, while the new links (U, 4), (5, R), (5, 4) are originated and/or terminated by a non monitored node. The lists L1, L3 at the end of the third iteration therefore are:
L1: (S, 4), (4, X), (4, 6), (7, X), (D, 7), (7, 6), (6, 5), (5, Y), (F, 5), (6, M), (E, 7), (U, 4), (5, R), (5, 4);
L3: (R, H), (B, S), (S, R), (G, U), (X, L), (U, Y), (Y, O), (Y, N), (A, P), (A, U) (R, P), (R, U), (C, S), (C, I), (X, S), (X, I), (U, R).

At the fourth iteration for the non monitored node 4, the following links are retrieved from the list L1: (S, 4), (4, X), (4, 6), (U, 4), (5, 4), which provide the following list L2 of new links: (S, X), (S, 6), (U, X), (U, 6), (5, X), (5, 6). Only the new links (S, X) and (U, X) are originated and terminated by monitored nodes, while the new links (S, 6), (U, 6), (5, X), (5, 6) are originated and/or terminated by a non monitored node. The lists L1, L3 at the end of the fourth iteration therefore are:
L1: (7, X), (D, 7), (7, 6), (6, 5), (5, Y), (F, 5), (6, M), (E, 7), (5, R), (S, 6), (U, 6), (5, X), (5, 6);
L3: (R, H), (B, S), (S, R), (G, U), (X, L), (U, Y), (Y, O), (Y, N), (A, P), (A, U) (R, P), (R, U), (C, S), (C, I), (X, S), (X, I), (U, R), (S, X), (U, X).

At the fifth iteration for the non monitored node 5, the following links are retrieved from the list L1: (6, 5), (5, Y), (F, 5), (5, R), (5, X) (5, 6), which provide the following list L2 of new links: (6, Y), (6, R), (6, X), (6, 6), (F, Y), (F, R), (F, X), (F, 6). Only the new links (F, Y), (F, R), (F, X) are originated and terminated by monitored nodes, while the other new links are originated and/or terminated by a non monitored node. The lists L1, L3 at the end of the fifth iteration therefore are:

L1: (7, X), (D, 7), (7, 6), (6, M), (E, 7), (S, 6), (U, 6), (6, Y), (6, R), (6, X), (F, 6);

L3: (R, H), (B, S), (S, R), (G, U), (X, L), (U, Y), (Y, O), (Y, N), (A, P), (A, U) (R, P), (R, U), (C, S), (C, I), (X, S), (X, I), (U, R), (S, X), (U, X), (F, Y), (F, R), (F, X).

At the sixth iteration for the non monitored node 6, the following links are retrieved from the list L1: (7, 6), (6, M), (S, 6), (U, 6), (6, Y), (6, R), (6, X), (6, 6), (F, 6), which provide the following list L2 of new links: (7, M), (7, Y), (7, R), (7, X), (S, M), (S, Y), (S, R), (S, X), (U, M), (U, Y), (U, R), (U, X), (F, M), (F, Y), (F, R), (F, X). Only the new links (7, M), (7, Y), (7, R), (7, X) are originated and/or terminated by a non monitored node, while the other new links are originated and terminated by monitored nodes. The lists L1, L3 at the end of the sixth iteration therefore are:

L1: (7, X), (D, 7), (E, 7), (7, M), (7, Y), (7, R);

L3: (R, H), (B, S), (S, R), (G, U), (X, L), (U, Y), (Y, O), (Y, N), (A, P), (A, U) (R, P), (R, U), (C, S), (C, I), (X, S), (X, I), (U, R), (S, X), (U, X), (F, Y), (F, R), (F, X), (S, M), (S, Y), (U, M), (F, M).

At the seventh and last iteration for the non monitored node 7, all the remaining links contained in the list L1 are retrieved, which provide the following list L2 of new links: (D, X), (D, M), (D, Y), (D, R), (E, X), (E, M), (E, Y), (E, R). All the new links are originated and terminated by monitored nodes, so they are all inserted in the list L3, whose final content is:

L3: (R, H), (B, S), (S, R), (G, U), (X, L), (U, Y), (Y, O), (Y, N), (A, P), (A, U) (R, P), (R, U), (C, S), (C, I), (X, S), (X, I), (U, R), (S, X), (U, X), (F, Y), (F, R), (F, X), (S, M), (S, Y), (U, M), (F, M), (D, X), (D, M), (D, Y), (D, R), (E, X), (E, M), (E, Y), (E, R).

These links are those of the graph GR" representing the partially monitored network NET of FIG. 7a, as it may be appreciated by comparing the list L3 with FIG. 7b.

Once a graph representing either a completely monitored network or a partially monitored network has been determined, it may be split into one or more clusters.

Preferably, a cluster is defined as a set of nodes of a graph representing a certain network which exhibits the property that each population member entering the cluster though an entry node of the cluster (namely, through a node originating one or more links and terminating no link) either exits the cluster through an exit node of the cluster (namely, through a node terminating one or more links and originating no link) or stations within the cluster. In other words, the entry node and exit nodes of a cluster represent obligatory passages for entering and exiting the cluster.

Several clusters of different sizes may be identified in a graph representing a completely or partially monitored network NET.

Figure 10:
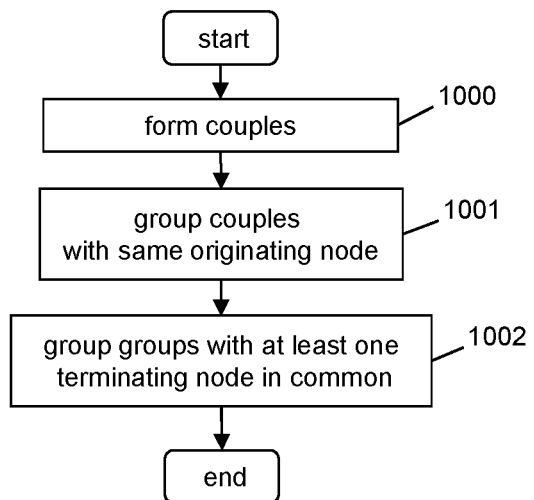
FIG. 10 is a flow chart of a procedure for determining the cluster of a graph representing a completely or partially monitored network, according to an embodiment of the present invention.

According to an embodiment, first clusters of the graph representing a completely or partially monitored network NET are identified by applying the algorithm shown in FIG. 10.

Firstly, preferably, all the links of the graph are identified (step 1000). In the exemplary graph GR" of FIG. 7b, the identified links are those of the list L3 resulting from execution of the algorithm of FIG. 9.

Then, preferably, all the links of the graph having the same originating node are grouped (step 1001). Hence, in the exemplary graph GR" of FIG. 7b, the following groups are identified:

(R, H), (R, P), (R, U),
(B, S),
(S, R), (S, M), (S, Y), (S, X),
(G, U),
(X, L), (X, S), (X, I),
(U, Y), (U, X), (U, R), (U, M),
(Y, O), (Y, N),
(A, P), (A, U),
(C, S), (C, I),
(F, Y), (F, R), (F, X), (F, M),
(D, X), (D, M), (D, Y), (D, R),
(E, X), (E, M), (E, Y), (E, R)

Then, preferably, all the groups of links having at least one terminating node in common are preferably further grouped (step 1002). Hence, in the exemplary graph GR" of FIG. 7b, the following groups are provided:

(R, H), (R, P), (R, U), (G, U), (A, P), (A, U),
(B, S), (X, L), (X, S), (X, I), (C, S), (C, I),
(S, R), (S, M), (S, Y), (S, X), (U, Y), (U, X), (U, R), (U, M), (F, Y), (F, R), (F, X), (F, M), (D, X), (D, M), (D, Y), (D, R), (E, X), (E, M), (E, Y), (E, R),
(Y, O), (Y, N).

The groups resulting from step 1002 are elementary or minimum-sized clusters of the graph representing a completely or partially monitored network NET.

Figure 11:
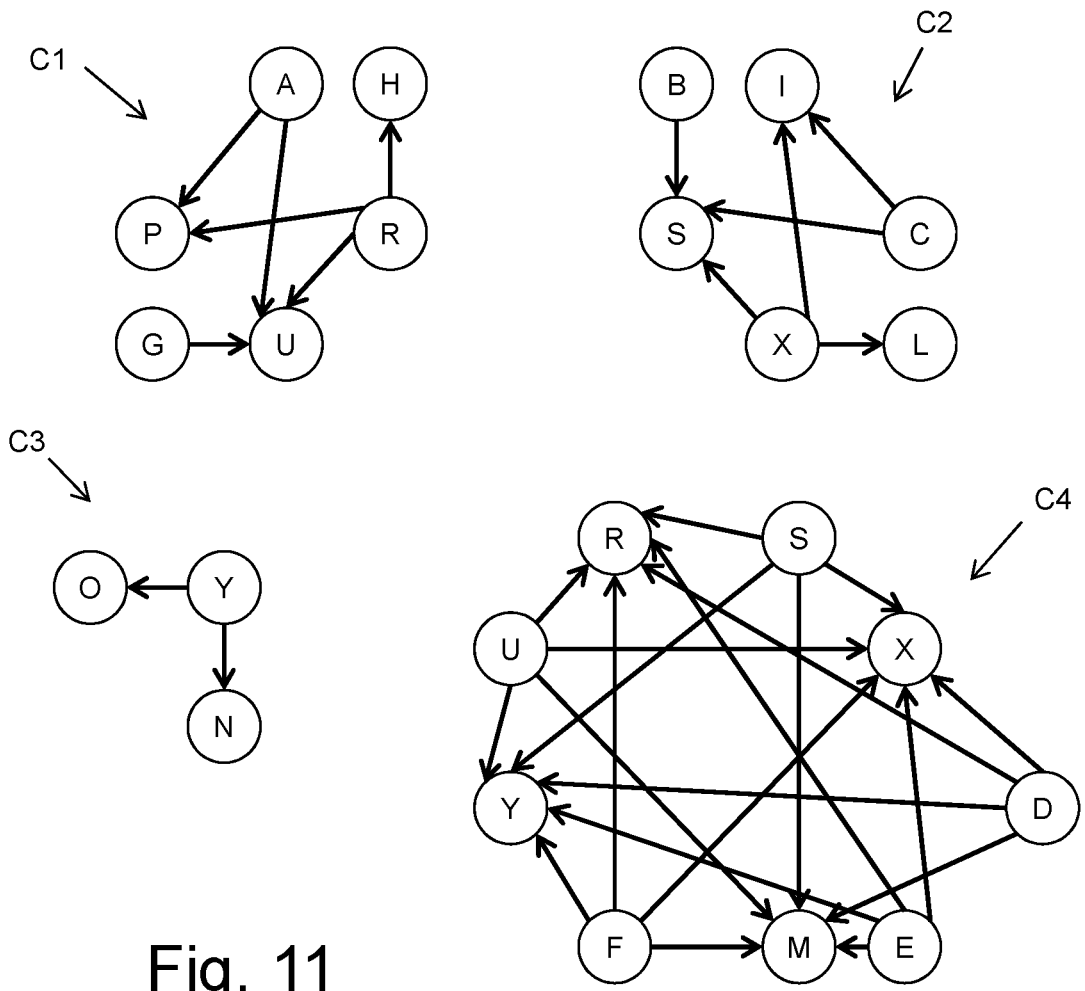
FIG. 11 shows the clusters obtained by applying the flow chart of FIG. 10 to the graph of FIG. 7b.

For instance, application of the above algorithm to the exemplary graph GR" of FIG. 7b allows identifying four clusters shown in FIG. 11:

cluster C1 comprising 3 entry nodes A, G, R and 3 exit nodes G, H, P;

cluster C2 comprising 3 entry nodes B, C, X and 3 exit nodes I, L, S;

cluster C3 comprising one entry node Y and 2 exit nodes N, O; and cluster C4 comprising 5 entry nodes D, E, F, S, U and 4 exit nodes M, R, U, Y.

Even if all the above clusters only comprise entry nodes and exit nodes, execution of the algorithm of FIG. 10 may lead to identification of a cluster comprising also intermediate nodes.

Further, two or more adjacent minimum-sized clusters identified as described above (wherein "adjacent" means that they have at least one node in common, which is an entry node for one cluster and an exit node for the adjacent cluster) may be grouped into further larger clusters, which still exhibit the above cluster property.

If in a completely or partially monitored network NET all the entry points and exit points are provided with respective sensors, the largest cluster is the whole graph itself that represents the network NET, which is provided by grouping all its minimum-sized clusters identified as described above.

It may be appreciated that each intermediate node of the graph representing a completely or partially monitored network may be at most the entry node for a single cluster identified as above and, at the same time, the exit node for another single cluster identified as above. Besides, each entry node of the graph representing a completely or partially monitored network is the entry node also for a single cluster identified as above and, similarly, each exit node of the graph representing a completely or partially monitored network is the exit node also for a single cluster identified as above.

It may be appreciated that the cluster property (namely, each population member entering the cluster through an entry node of the cluster either exits the cluster through an exit node of the cluster or stations within the cluster) basically is the same as that of the area AR of FIG. 1

(namely, each population member entering the area AR through an entry point of the area A either exits the area through an exit point of the area AR or stations within the area AR).

Hence, the above algorithm for statistically tracking the dynamics of a population over the area AR may be applied to any of the clusters of the graph representing a completely or partially monitored network NET.

Figure 12:
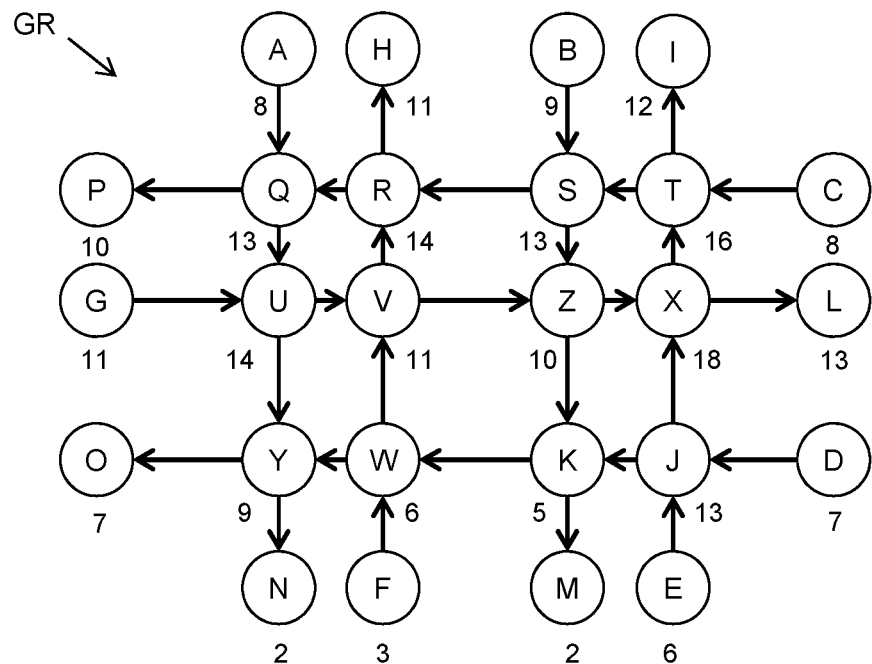
FIGS. 12 and 13 show exemplary counter values for the graphs of FIGS. 4b and 7b, respectively.

Reference is made, by way of example, to the network NET completely monitored with sensors at the intersections arranged as shown in FIG. 4a. The graph GR representing such network NET and sensors is shown again in FIG. 12, together with exemplary values of the counters provided for each monitored node at the first reading (time T1).

Assuming that a tracking is desired of the dynamics of vehicles across the network NET considered as a whole, as described above three variables IN(0), OUT(0) and INSIDE(0) indicating the number of entering members, exiting members and stationing members at the start time T0, respectively, are preferably set equal to 0.

Then, $\Delta INSIDE(1)$ is calculated by applying the above equation [2], where IN(1) is calculated as the summation of the counter values provided at the entry nodes of the graph GR as a whole (namely, A, B, C, D, E, F, G) and OUT(1) is calculated as the summation of the counter values provided at the exit nodes of the graph GR as a whole (namely, H, I, L, M, N, O, P). These values provide $\Delta IN(1) = IN(1) - IN(0) = (8+9+8+7+6+3+11) - (0) = 52$ and $\Delta OUT(1) = OUT(1) - OUT(0) = (11+12+13+2+2+7+10) - 0 = 57$. Hence, $\Delta INSIDE(1) = 52 - 57 = -5$. Hence, by applying the above equation [3], $INSIDE(1) = INSIDE(0) + \Delta INSIDE(1) = -5$. Since this value is negative, a correction is required to the value of INSIDE(0) and INSIDE(1) according to the above equation [4], which provides $INSIDE(0) = 5$ and $INSIDE(1) = 0$.

Hence, at the first reading of the counter values at time T1 it may be provisionally concluded that at least 5 vehicles were within the road network NET at the time T0 and that, in the time gap between T0 and T1, 52 vehicles entered the network NET and 57 vehicles exited the network NET, so that the number of vehicles within the network NET is decreased by 5. This estimate may be further improved by further readings of the counter values, as described above.

Figure 13:
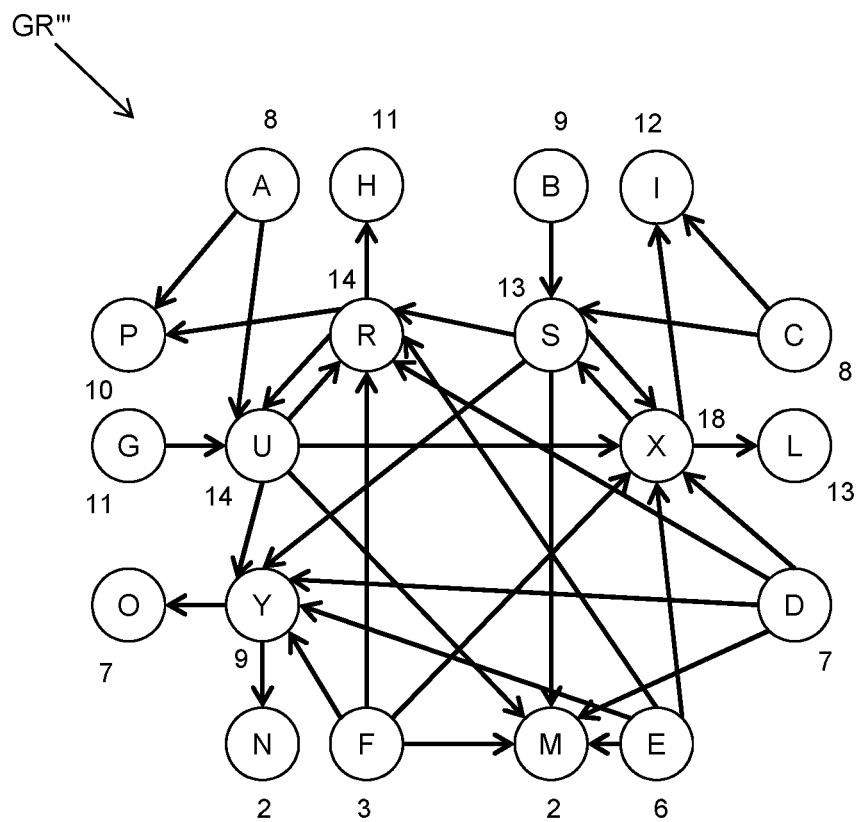

Similar considerations apply in case the road network NET is partially monitored as shown in FIG. 7a. The graph GR" representing such network NET and sensors is shown again in FIG. 13, together with exemplary values of the counters provided at each monitored node at the first reading (time T1).

Assuming that a tracking is desired of the dynamics of vehicles across the network NET considered as a whole, as described above three variables IN(0), OUT(0) and INSIDE(0) indicating the number of entering members, exiting members and stationing members at the start time T0, respectively, are preferably set equal to 0.

Then, $\Delta INSIDE(1)$ is calculated by applying the above equation [2], where IN(1) is calculated as the summation of the counter values provided at the entry nodes of the graph GR as a whole (namely, A, B, C, D, E, F, G) and OUT(1) is calculated as the summation of the counter values provided at the exit nodes of the graph GR as a whole (namely, H, I, L, M, N, O, P). Since the entry points and exit points are the same as for the graph GR representing the completely monitored network, the obtained results in terms of values of INSIDE(0) and INSIDE(1) are the same as above, irrespective of the fact that not all the intersections of the network NET are provided with sensors.

The statistical tracking however may be done cluster by cluster in order to provide a spatially finer tracking.

Reference is made again, by way of example, to the road network NET partially monitored as shown in FIG. 7a. As described above, the graph GR" representing such network NET and sensors may be divided into four minimum-size clusters C1, C2, C3, C4, which are shown again in FIG. 14, together with exemplary values of the counters provided at each monitored node at the first reading (time T1).

Assuming that a tracking is desired of the dynamics of vehicles across the network NET cluster by cluster, for the cluster C1 three variables $IN(0)_1$, $OUT(0)_1$ and $INSIDE(0)_1$ indicating the number of entering members, exiting members and stationing members at the start time T0, respectively, are preferably set equal to 0.

Then, $\Delta INSIDE(1)_1$ for cluster C1 is calculated by applying the above equation [2], where $IN(1)_1$ is calculated as the summation of the counter values provided at the entry nodes of the cluster C1 (namely, A, R, G) and $OUT(1)_1$ is calculated as the summation of the counter values provided at the exit nodes of the cluster C1 (namely, H, P, U). These values provide $\Delta IN(1)_1 = IN(1)_1 - IN(0)_1 = (8+14+11) - (0) = 33$ and $\Delta OUT(1)_1 = OUT(1)_1 - OUT(0)_1 = (11+10+14) - 0 = 35$. Hence, $\Delta INSIDE(1)_1 = 33 - 35 = -2$. Hence, by applying the above equation [3], $INSIDE(1)_1 = INSIDE(0)_1 + \Delta INSIDE(1)_1 = -2$. Since this value is negative, a correction is required to the value of $INSIDE(0)_1$ and $INSIDE(1)_1$ according to the above equation [4], which provides $INSIDE(0)_1 = 2$ and $INSIDE(1)_1 = 0$.

Hence, at the first reading of the counter values at time T1 it may be provisionally concluded that at least 2 vehicles were within the cluster C1 at the time T0 and that, in the time gap between T0 and T1, 33 vehicles entered the cluster C1 and 35 vehicles exited the cluster C1, so that the number of vehicles within the cluster C1 is decreased by 2. This estimate may be further improved by further readings of the counter values, as described above.

The same procedure may be applied to the other clusters C2, C3, C4, which provides the following results:

$$INSIDE(1)_2 = INSIDE(0)_2 + (\Delta IN(1)_2 - \Delta OUT(1)_2) = 35 - 38 = -3;$$

$$INSIDE(1)_3 = INSIDE(0)_3 + (\Delta IN(1)_3 - \Delta OUT(1)_3) = 43 - 43 = 0;$$

$$INSIDE(1)_4 = INSIDE(0)_4 + (\Delta IN(1)_4 - \Delta OUT(1)_4) = 9 - 9 = 0;$$

Hence, at the first reading of the counter values at time T1 it may be provisionally concluded that:
- at least 3 vehicles were within the cluster C2 at the time T0 and, in the time gap between T0 and T1, 35 vehicles entered the cluster C2 and 38 vehicles exited the cluster C2, so that the number of vehicles within the cluster C2 is decreased by 3.
- in the time gap between T0 and T1, 43 vehicles entered the cluster C3 and 43 vehicles exited the cluster C3, so that the number of vehicles within the cluster C3 is unchanged.
- in the time gap between T0 and T1, 9 vehicles entered the cluster C4 and 9 vehicles exited the cluster C4, so that the number of vehicles within the cluster C4 is unchanged.

These estimates may be further improved by further readings of the counter values, as described above.

It may be appreciated that the calculation of INSIDE(i) (i=0, 1, 2, . . . ) for a graph representing a completely or partially monitored network as a whole does not take into account any displacement of the population members within the network. As long as a population member does not cross an entry point or an exit point of the area or network as a whole, it is not counted and hence it is not considered in the calculation of INSIDE(i). If the number of population members stationing within the area or network as a whole is instead calculated as the sum of the variables INSIDE(i) calculated for its clusters separately (e.g. $INSIDE(1)_1 + INSIDE(1)_2 + INSIDE(1)_3 + INSIDE(1)_4$), the result is more accurate, because the cluster variables are calculated taking into account passages of the population members through the boundaries of adjacent clusters.

Hence, generally, the value of INSIDE(i) calculated as a whole for an aggregation of two or more clusters is lower than INSIDE(i) calculated as a sum of the variables calculated for each cluster separately. The longer the tracking time, the higher the convergence between the two values.

Displacements of population members within a minimum-size cluster instead can not be detected, hence they can not contribute to make the value of INSIDE(i) more precise.

The above calculations provided for each cluster of a graph representing a completely or partially monitored network NET may also be used for determining a traffic matrix, indicating the displacement of population members amongst clusters.

For example, with reference to clusters C1, C2, C3, C4 above, it may be noticed that C1 and C4 are adjacent in that they have in common nodes R and U, R being an entry node for C1 and an exit node for C4 and U being an exit node for C1 and an entry node for C4. Hence, the counters provided at the nodes R and U indicate the number of population members moving from C4 to C1 and vice versa.

Similarly, C2 and C4 are adjacent in that they have in common nodes S and X, S being an entry node for C4 and an exit node for C2 and X being an exit node for C4 and an entry node for C2. Hence, the counters provided at the nodes S and X indicate the number of population members moving from C2 to C4 and vice versa.

Similarly, C3 and C4 are adjacent in that they have in common the node Y, Y being an entry node for C3 and an exit node for C4. Hence, the counters provided at the node Y indicates the number of population members moving from C4 to C3.

Figures 14, 15:
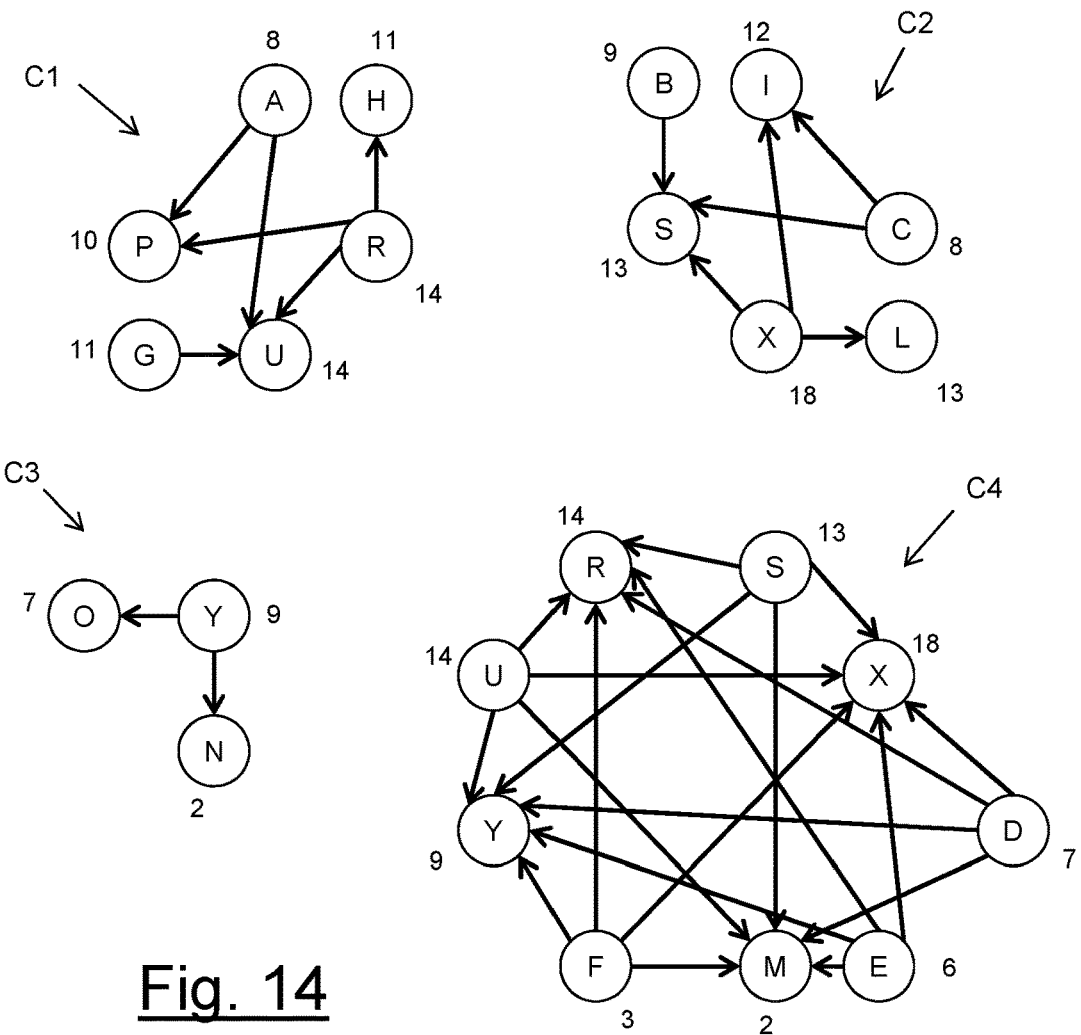
FIG. 14 shows exemplary values for the clusters of FIG. 11.
FIG. 15 shows an exemplary traffic matrix for the clusters of FIG. 11.

An exemplary traffic matrix TM relating to clusters C1, C2, C3, C4 is shown in FIG. 15. The exemplary values are those set forth in FIG. 14. At each reading of the counter values, the traffic matrix TM is preferably updated.

Also the information comprised in the traffic matrix TM may be advantageously provided at the input of other data processing algorithms (e.g. neural networks), e.g. for reconstructing the patterns of vehicles (traffic congestions, queues, etc.) due to car accidents, work in progress, failures to traffic lights, etc. This may be useful for example in the context of smart city applications, to manage the traffic and transportation systems more efficiently.

After each cluster has been identified as described above, it may be mapped onto the complete graph representing the network NET and comprising nodes representing sensors actually present in the monitored network NET and, if the network is partially monitored, nodes representing missing sensors.

For this purpose, for each entry node of the cluster, in the complete graph the links originating by that entry node are preferably identified. Then, for each exit node of the cluster, in the complete graph the links terminated by that exit node are preferably identified. This way, all the links of the cluster are identified on the complete graph, except (if any) the links connecting non monitored nodes.

It shall be noticed that, though the above considerations on graphs and clusters are related to networks (in particular, road networks), this is not limiting. Graphs may be used to represent any kind of area having a certain number of entry points, a certain number of exit points and being divided into two or more non-overlapping sub-areas, the passage between a sub-area and an adjacent sub-area being allowed by one or more transit points. As for the network case, also in this case sensors and counters may be provided at the entry point(s), exit point(s) and transit point(s) of the area. If all the points are provided with sensors and counters, the area is completely monitored, otherwise it is partially monitored. In any case, the area and sensors may be represented by a graph similar to those described above, with nodes representing the sensors and links between the nodes. This graph may be split into clusters as described above, and the dynamics of the population in the area may be statistically tracked cluster by cluster.

The invention claimed is:

1. A method for statistically tracking dynamics of a population over an area, said area comprising at least one entry point and at least one exit point, each member of said population entering said area through said at least one entry point, either exiting said area through said at least one exit point or stationing within said area, said method comprising:
   a) at each entry point, providing an entry counter counting a number of members entering said area through said entry point and, at each exit point, providing an exit counter counting a number of members exiting said area through said exit point; and
   b) by a processing unit,
      calculating a number of members stationing within said area a plurality of times i, and
      at the i-th calculation:
         determining if said calculated number of members stationing within said area is higher than or equal to 0, and if said calculated number of members stationing within said area is higher than or equal to 0, calculating a next (i+1)-th calculation, and
         determining if said calculated number of members stationing within said area is lower than 0, and if said calculated number of members stationing within said area is lower than 0, adjusting all values of said number of members stationing within said area previously calculated up to the i-th calculation by subtracting said calculated number of members stationing within said area at the i-th calculation therefrom; and
      based on values of said entry counter and said exit counter, statistically tracking the dynamics of said population in terms of an evolution in time of said calculated number of members stationing in said area, wherein
      a calculated number of members assumed to be stationing within said area at a beginning of an observation period is increased when the counted number of members exiting said area during said observation period is higher than the counted number of members entering said area during said observation period plus the number of members assumed to be stationing within said area at the beginning of said observation period.

2. The method according to claim 1, wherein the method further comprises providing a sensor at each entry point capable of detecting passage of each member entering said area through said entry point and providing a sensor at each exit point capable of detecting passage of each member exiting said area through said exit point, said entry counter counting the number of members entering said area through said entry point as detected by the sensor provided at said entry point and said exit counter counting the number of members exiting said area through said exit point as detected by the sensor provided at said exit point.

3. The method according to claim 1, wherein step b) comprises applying, to said values of said entry counter and said exit counter, the following equation:

$$\Delta IN - \Delta OUT = \Delta INSIDE$$

where $\Delta IN$ is the number of members entering said area during said observation period, $\Delta OUT$ is the number of members exiting said area during said observation period and $\Delta INSIDE$ is a variation of the number of the members stationing within said area during said observation period.

4. The method according to claim 3, wherein step b) comprises:
at a tracking start time T0, setting to 0 a variable INSIDE (0) indicating the number of members stationing in said area at said tracking start time T0;
periodically reading the values of said entry counter and said exit counter and, at an i-th reading, i being a reading index:
calculating a value of $\Delta INSIDE(i)$ as $\Delta IN(i)-\Delta OUT(i)$, wherein $\Delta IN(i)=IN(i)-IN(i-1)$, $\Delta OUT(i)=OUT(i)-OUT(i-1)$ and wherein $IN(i)$ is a summation of values of said entry counter at said i-th reading, $IN(i-1)$ is a summation of values of said entry counter at a preceding $(i-1)$-th reading, $OUT(i)$ is a summation of values of said exit counter at said i-th reading, and $OUT(i-1)$ is a summation of values of said exit counter at said preceding $(i-1)$-th reading;
calculating a number of stationing members $INSIDE(i)$ as $INSIDE(i-1)+\Delta INSIDE(i)$; and:
if $INSIDE(i)$ is higher than or equal to 0, waiting for a next $(i+1)$-th reading; and
if $INSIDE(i)$ is lower than 0, adjusting all values of $INSIDE(j)$ ($j=0, 1, \ldots i$) previously calculated up to said i-th reading by subtracting $INSIDE(i)$ therefrom.

5. The method according to claim 1, wherein
said area is divided into a number of sub-areas, at least one obligatory passage point being provided between adjacent sub-areas, and
said method further comprises:
a') at said at least one obligatory passage point, providing an intermediate counter counting a number of members passing between the adjacent sub-areas through said obligatory passage point; and
b') representing said area as a graph, each node of said graph representing an entry point or an exit point of said area or an obligatory passage point of said area provided with a respective intermediate counter, said nodes being joined by arrows indicating unidirectional links between nodes as allowed by a physical topology of said area.

6. The method according to claim 5, wherein each of the at least one obligatory passage point between the adjacent sub-areas of said area is provided with a respective intermediate counter.

7. The method according to claim 5, wherein
the at least one obligatory passage point includes a plurality of obligatory passage points, and only a subset of the obligatory passage points between the adjacent sub-areas of said area is provided with a respective intermediate counter.

8. The method according to claim 7, wherein the method further comprises determining said graph from a complete graph representing said area and comprising nodes representing said entry point of said area, said exit point of said area, and all of the obligatory passage points of said area, said determining comprising:
providing a list of links of said complete graph originated and/or terminated by a node representing an obligatory passage point not provided with an intermediate counter;
providing a further list links of said complete graph originated and terminated by nodes representing exit points, entry points, or obligatory passage points provided with intermediate counters;
for each obligatory passage point not provided with the intermediate counter:
finding in said list all links originated and/or terminated by said obligatory passage point not provided with the intermediate counter;
forming at least one new link by combining each found link terminated by said obligatory passage point not provided with the intermediate counter with each found link originated by said obligatory passage point not provided with the intermediate counter;
if said at least one new link is originated and terminated by nodes representing exit points, entry points, or obligatory passage points provided with intermediate counters, inserting said at least one new link in said further list;
if said at least one new link is originated and/or terminated by a further obligatory passage point not provided with an intermediate counter, inserting said at least one new link in said list; and
removing said links originated and/or terminated by said obligatory passage point not provided with the intermediate counter from said list; and
building said graph using the links of said further list.

9. The method according to claim 5, wherein
step b) further comprises splitting said graph into one or more clusters, each cluster being a set of nodes of said graph wherein each member entering said cluster though an entry node of said cluster either exits said cluster through an exit node of said cluster or stations within said cluster,
step b) further comprises, for at least one of said clusters:
by said processing unit, based on values of one or more counters provided at one or more entry nodes of said cluster and one or more counters provided at one or more exit nodes of said cluster, statistically tracking the dynamics of said population in terms of an evolution in time of a number of members stationing in said cluster, and
said number of members stationing within said cluster is retroactively adjusted when it is determined that a number of members exiting said cluster during said observation period is higher than a number of members entering said cluster during said observation period plus the number of members stationing within said cluster at the beginning of said observation period.

10. The method according to claim 9, wherein the method further comprises statistically tracking the dynamics of said population in terms of number of members displacing amongst said clusters based on said values of said one or more counters provided at one or more entry nodes of each cluster and values of said one or more counters provided at one or more exit nodes of each cluster.

11. A system for statistically tracking dynamics of a population over an area, said area comprising at least one entry point and at least one exit point, each member of said population entering said area through said at least one entry point, either exiting said area through said at least one exit point or stationing within said area, said system comprising:

at each entry point, an entry counter counting a number of members entering said area through said entry point;

at each exit point, an exit counter counting a number of members exiting said area through said exit point; and a processing unit configured to:

calculate a number of members stationing within said area a plurality of times i; and at the i-th calculation:

determine if said calculated number of members stationing within said area is higher than or equal to 0, and if said calculated number of members stationing within said area is higher than or equal to 0, calculate a next (i+1)-th calculation, and determine if said calculated number of members stationing within said area is lower than 0, and if said calculated number of members stationing within said area is lower than 0, adjust all values of said number of members stationing within said area previously calculated up to the i-th calculation by subtracting said calculated number of members stationing within said area at the i-th calculation therefrom, and based on values of said entry counter and said exit counter, statistically track the dynamics of said population in terms of an evolution in time of said calculated number of members stationing in said area, wherein said processing unit is configured to:

increase a calculated number of members assumed to be stationing within said area at a beginning of an observation period when the counted number of members exiting said area during said observation period is higher than the counted number of members entering said area during said observation period plus the number of members assumed to be stationing within said area at the beginning of said observation period.

* * * * *